United States Patent
Aaron et al.

(10) Patent No.: US 8,064,938 B2
(45) Date of Patent: Nov. 22, 2011

(54) ADAPTIVE MULTI-TIERED RE-CODING FOR IMPROVED COMMUNICATIONS RESOURCE UTILIZATION

(75) Inventors: Jeffrey A. Aaron, Atlanta, GA (US); Cheng P. Liu, Duluth, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 408 days.

(21) Appl. No.: 12/415,124

(22) Filed: Mar. 31, 2009

(65) Prior Publication Data

US 2010/0248763 A1 Sep. 30, 2010

(51) Int. Cl.
*H04B 7/00* (2006.01)
(52) U.S. Cl. ..................................... 455/509; 455/452.2
(58) Field of Classification Search .................. 455/509, 455/452.2, 3, 67.11, 452.1, 450, 453, 69, 455/451; 370/329
See application file for complete search history.

(56) References Cited

U.S. PATENT DOCUMENTS

2008/0268862 A1* 10/2008 Kent et al. .................. 455/452.2
* cited by examiner

*Primary Examiner* — Joseph Lauture
(74) *Attorney, Agent, or Firm* — Turocy & Watson, LLP

(57) ABSTRACT

System(s) and method(s) that, periodically or when triggered, adapt data rates in multiple tiers of a network are presented. A top tier feedback (FB) loop adapts on a longer time scale associated with its longer path transit time for FB communication messages from a wireless portion to a data source in the wire-line portion of the network. A bottom tier FB loop adapts very quickly, and on a shorter time scale that the top tier FB loop due to its shorter FB path transit time, at the wireless edge with sufficient speed to accurately adapt to fast-changing wireless conditions. The top tier provides efficient resource utilization down to the bottom tier, and the bottom tier provides efficient resource utilization within the wireless portion of the network. A middle tier(s) can be added as desired to provide a more gradual stepped adaptation from source to destination.

27 Claims, 13 Drawing Sheets

ADAPTIVE MULTI-TIERED RE-CODING FOR IMPROVED COMMUNICATIONS RESOURCE UTILIZATION

Technical Field

The subject innovation generally relates to wireless communications, and, more particularly, to employing adaptive multi-tiered re-coding for improved communications resource utilization.

BACKGROUND

In a wireless network (e.g., mobile core network), a typical Quality of Service (QoS) approach is to provide "best effort" when servicing applications. However, as applications or services utilized in the wireless network become more prevalent and more data intensive (e.g., video, multimedia), providing QoS for these applications or services can become more challenging. Further, a QoS of "best effort" is not desirable and/or sufficient for many new applications or services. Traditional QoS approaches are not sufficient due to, for instance, large uncontrollable variations in radio frequency (RF) link conditions (and resulting available bandwidth).

Conventionally, rate adaptation (e.g., coding rate, which translates to a corresponding bandwidth) is used to provide decent QoS with efficient resource utilization for voice calls in wireless systems (e.g., cellular systems); however, rate adaptation based on network conditions is generally not used for video or other applications or services, which are highly sensitive to QoS conditions such as delay/latency, jitter, packet loss, etc. Rate adaptation can be performed at the source (e.g., a video server) of the application or service, but the associated feedback (FB) loop from the radio link to the source can be very long since the source may often be deep in the network (e.g., deep in the wire-line portion of the network), not close to the edge of the wireless portion of the network, and the amount of time for FB communication between the source and radio link increases with an increase in distance between the source and radio link. As a result, often the FB adaptation delay can be too large to be effective for fast-changing conditions such as in the RF link (e.g., the rate coding can change, but by the time the change is performed at the other end of the FB loop (e.g., at the source), the RF conditions may have already changed again, so as to make the adapted rate inappropriate by the time it is changed). Bringing a full-bandwidth/full rate/full resolution data stream all the way from the source to the wireless edge would allow rate adaptation closer to the mobile communication device, which would allow sufficiently fast adaptation, but at large scale would consume an undesirable (e.g., enormous) amount of bandwidth resources in the wire-line portion of the network. It is desirable to provide sufficiently fast adaptation time to change conditions in the wireless portion of the network without consuming an undesirable (e.g., enormous) amount of wire-line bandwidth resources.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s) and method(s) that, periodically or when triggered, adapt respective data rates (or correspondingly rate coding) in multiple tiers of a network are presented. In an embodiment, a communication network can comprise a wireless portion wherein wireless communications devices (e.g., mobile phones, personal digital assistants (PDAs), computers, etc.) can be connected to the network and can communicate wirelessly with other communication devices (e.g., wired communication devices, wireless communication devices) in the network. The communication network also can include a wire-line portion associated with the wireless portion, wherein, in the wire-line portion, various communication devices (e.g., computers, servers, phones, or any data source that can provide content, such as video content, audio content, textual content, multimedia content, etc.) can be connected via a wired connection to the network and can communicate with other communication devices (e.g., wireless communication devices in the wireless portion, other communication devices in the wire-line portion) in the network.

In another aspect, the communication network can employ multiple tiers or points (e.g., nodes) where data rates can be monitored and respectively controlled (e.g., adapted, modified, adjusted) based at least in part on feedback (FB) information regarding the wireless link conditions (e.g., radio link conditions) associated with the wireless portion and/or other desired information obtained from various components (e.g., adaptation nodes) in the tiers. In still another aspect, the communication network can employ a multi-tier controller that can control the setting or adapting data rates or correspondingly rate coding related to the output data rate associated with respective adaptation nodes (e.g., located near a base station, a data source, or another desired location(s) in the communication network) in the respective tiers. The wireless communication device(s) and/or the adaptation nodes can provide FB regarding the wireless link conditions, Quality of Service (QoS), volatility of the radio link, and/or a maximum recoverable data rate (e.g., associated with a middle tier, associated with a top tier) to the multi-tier controller, and the multi-tier controller can evaluate the FB information to facilitate respectively adapting data rates for the respective adaptation nodes in the network. In an aspect, the multi-tier rate adapting can be employed with regard to a communication device when the communication device (e.g., wireless communication device) initiates an application or a service in the communication network and can continue until the communication device exits the application or service.

For example, the network can employ a top tier feedback (FB) loop that can adapt the rate coding or corresponding data rate associated with an adaptation node (e.g., source adaptation node), which can be located near and associated with a data source (e.g., video server) associated with the network, on a relatively long time scale associated with its longer path transit time for FB communication messages from a wireless portion, or an edge adaptation node at the edge of the wireless portion, to the source adaptation node in the wire-line portion of the network. For instance, the multi-tier controller can employ a long timer that can be associated with the top tier and the data rate or corresponding rate coding for the top tier can be re-evaluated and adapted when the long time threshold of the long timer is reached (or when adaptation is dynamically triggered as disclosed herein). A bottom tier FB loop can be associated with an edge adaptation node, which can be located near and associated with a base station serving the wireless communication device, and can adapt the data rate associated with the bottom tier very quickly, and on a shorter time scale than the top tier FB loop due to its shorter FB path transit time, at the wireless edge with sufficient speed to accurately adapt to fast-changing wireless communication conditions associated with the wireless communication device. For instance, the multi-tier controller can employ a short timer that can be associated with the bottom tier and can have a shorter adaptation time interval than the long timer, and the data rate or corresponding rate coding for the bottom tier can be re-evaluated and adapted when the short time threshold of the short timer is reached. The multi-tier controller can receive the FB information relating to communication conditions from the bottom tier (e.g., from the communication device and/or base station) during the long adaptation time interval associated with the top tier and can use that FB information to facilitate determining the adapted data rate for the top tier during the next long adaptation time interval of the top tier. As a result, the top tier can provide efficient resource utilization down to the bottom tier, and the bottom tier can provide efficient resource utilization within the wireless portion of the network. In an aspect, one or more middle tiers, which can be associated with one or more intermediate adaptation nodes (e.g., adaptation node(s) in the core network), can be added as desired to provide a more gradual stepped adaptation from the source (e.g., data source) to the destination (e.g., edge adaptation node, or wireless communication device).

In an aspect, the adaptation of the data rate or rate coding can be based at least in part on predefined adaptation criteria. The predefined adaptation criteria can relate to the particular tier for which the data rate is being adapted, the number of tiers in the network, radio link conditions associated with the wireless communication device in the wireless portion of the network, the respective FB loop lengths of the respective tiers, the maximum recoverable data rate for the tier above the tier being adapted (e.g., when the data rate associated with a middle tier is being adapted, the maximum recoverable data rate for the top tier can be considered), whether the data rate of the particular tier is being adapted due to a periodic adaptation or a triggered adaptation, average data rate for data rates of a lower tier (e.g., tier immediately beneath the tier being adapted, ranging from top tier to lower tier) during the most recent applicable adaptation time interval, trending data rate for a lower tier (e.g., tier immediately beneath the tier being adapted, ranging from top tier to lower tier) during the most recent applicable adaptation time interval, the margin employed for a particular adaptation (e.g., margin employed for a middle tier, margin employed for a top tier), and/or other adaptation criteria.

For example, the multi-tier controller can determine or calculate a data rate associated with a top tier based at least in part on the average data rates of the tier (e.g., a middle tier, if any; bottom tier if there is no middle tier) directly beneath the top tier in the multi-tier architecture during the last adaptation time interval (e.g., long adaptation time interval) associated with the top tier, or can employ a trend algorithm that can determine the trend of data rates for the tier directly beneath the top tier during the last adaptation time interval associated with the top tier and can determine the adapted data rate for the top tier based at least in part on the trend of data rates for the tier underneath the top tier. In an aspect, the multi-tier controller can adjust (e.g., increase) the determined or calculated data rate for a tier by a margin amount respectively associated with that tier, which can be determined based at least in part on the predefined adaptation criteria, and can be determined, for example, based at least in part on a percentage of the determined data rate or a specified amount of adjustment of data rate from the determined or calculated data rate associated with that tier.

In yet another aspect, the multi-tier controller can dynamically and automatically trigger re-adapting a data rate associated with the top tier (and/or a middle tier(s)), even if the time threshold associated with the top tier (and/or middle tier) has not been reached, based at least in part on the predefined adaptation criteria, wherein the predefined adaptation criteria can indicate that dynamic triggering to re-adapting a data rate for the top tier (and/or a middle tier(s)) is to occur when the data rate desired by the bottom tier changes (e.g., increases) to a predetermined data rate, or the rate of change of the data rate associated with the bottom tier meets or exceeds a predetermined threshold rate of change, or the difference between a newly adapted data rate and the previous data rate associated with the bottom tier meets or exceeds a predetermined rate differential threshold.

In accordance with various aspects and embodiments, the multi-tier architecture can be employed in a wire-line communication network, such as a communication network that employs digital subscriber line (DSL), T-1, E-1, T-3, E-3, digital signal 0(DS0), E-0, frame relay, synchronous optical networking (SONET), asynchronous transfer mode (ATM), Internet Protocol (IP) routing, multi-protocol label switching (MPLS), optical transmission, cable, etc., where the wire-line communication network can be divided into a desirable number of multiple tiers. Multiple adaptation nodes can be distributed between a communication device providing data and a communication device receiving the data in the wire-line communication network, and the data rates or rate coding of the respective adaptation nodes can be adapted based at least in part on the predefined adaptation criteria. In accordance with various other aspects and embodiments, the multi-tier architecture can be employed in a wireless communication network, such as a communication network that employs global system for mobile communications (GSM), code division multiple access (CDMA), Long Term Evolution (LTE), 3G cellular, 4G cellular, ad-hoc networks, mesh networks, etc., where the wireless communication network can be divided into a desirable number of multiple tiers. Multiple adaptation nodes can be distributed between a communication device providing data and a communication device receiving the data in the wireless communication network, and the data rates or rate coding of the respective adaptation nodes can be adapted based at least in part on the predefined adaptation criteria. In accordance with various other aspects and embodiments, a multi-tier architecture can be employed in mixed wireless-wireline communication networks, such as more fully disclosed herein.

In accordance with various other aspects and embodiments, methods that can employ respective adaptation of data rates for respective tiers of a communication network having multiple tiers are presented; and devices that can facilitate adaptation of data rates of respective tiers in a communication network having multiple tiers are presented.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
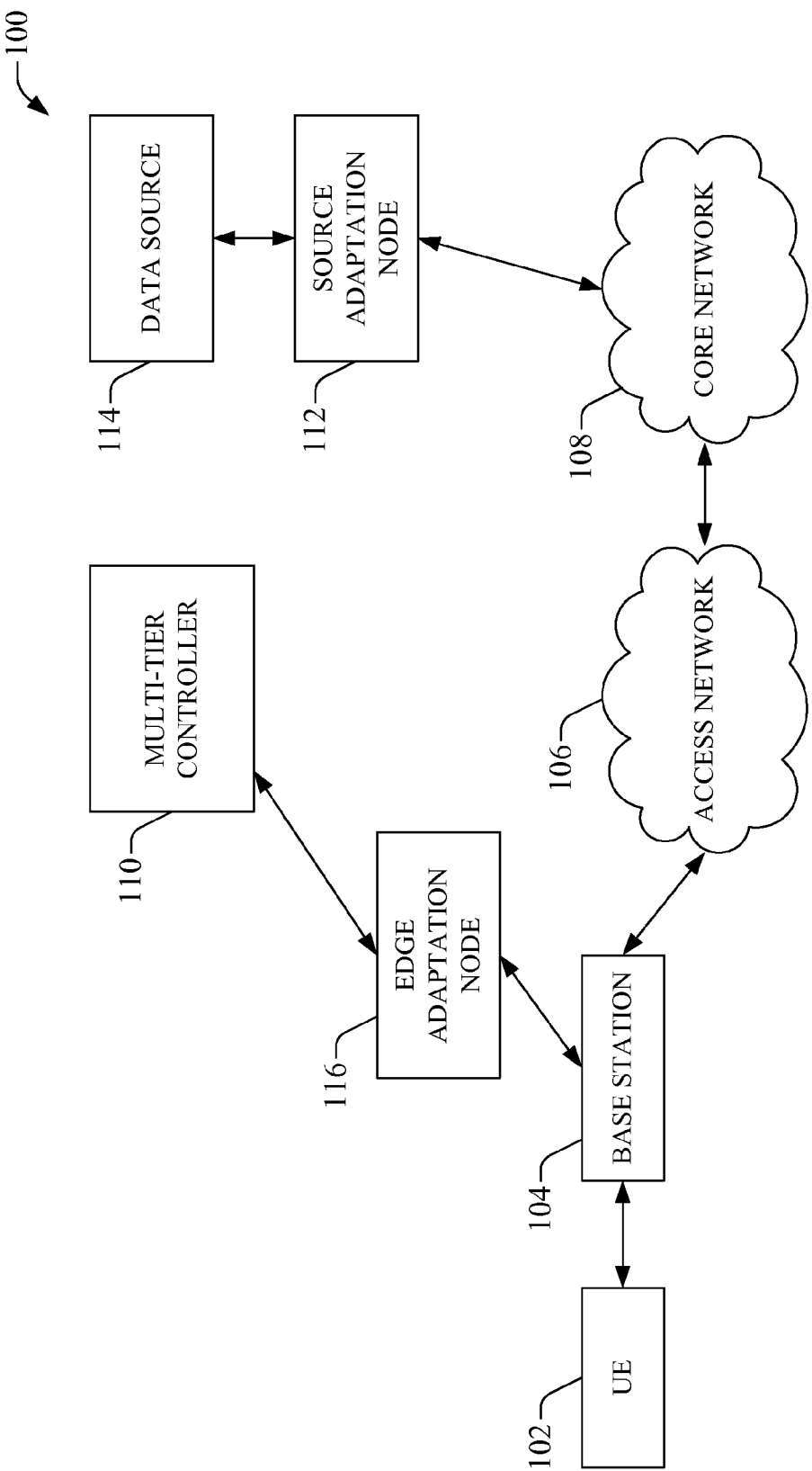
FIG. 1 is a block diagram of an example system that can perform rate adaptation of multiple tiers in a communication network in accordance with an embodiment of the disclosed subject matter.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set top box, Internet Protocol Television (IPTV), etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations are relevant to the subject specification.

3G Third Generation
3GPP Third Generation Partnership Project
AGPS Assisted GPS
AP Access Point
ADSL Asymmetric Digital Subscriber Line
AWS Advanced Wireless Services
BRAS Broadband Remote Access Server
BTA Basic Trading Area
CN Core Network
CS Circuit-Switched
CSCF Call Session Control Function
CPE Customer Premise Equipment CPN Customer Premise Network
DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
XDSL Asynchronous-DSL or Synchronous-DSL Referring to the drawings, FIG. 1 is a block diagram of an example system 100 that can perform rate adaptation of multiple tiers in a communication network in accordance with an embodiment of the disclosed subject matter. In an aspect, example system 100 can include a UE 102 (e.g., mobile communication device, such as a mobile phone (e.g., 3GPP UMTS phone); personal digital assistant (PDA); computer; IP television (IPTV); set-top box; etc.) in a communication environment (e.g., communication environment comprising a wireless portion and a wire-line portion of a communication network; communication environment comprising a wire-line portion of a communication network). The UE 102 can be located in the wireless portion (e.g., region) of the communication network, for example. The UE 102 can be connected (e.g., wirelessly connected) to a base station 104 to facilitate communication in the wireless communication environment. The base station 104 can serve a coverage macro cell that can cover a specified area, and the base station 104 can service mobile wireless devices, such as UE 102, in the area covered by the macro cell, where such coverage can be achieved via a wireless link (e.g., uplink (UL), downlink (DL)). When an attachment attempt is successful, UE 102 can be served by base station 104 and incoming voice and data traffic can be paged and routed to the UE 102 through the base station 104, and outgoing voice and data traffic from the UE 102 can be paged and routed through the base station 104 to other communication devices (e.g., another UE (not shown)). The base station 104 can be located at the edge of a wire-line portion and the wireless portion of the communication network.

In an aspect, the base station 104 can be associated (e.g., connected directly, or indirectly via a radio network controller (RNC)) with an access network 106, such as a wire-line access network, which can be in the wire-line portion of the communication network and can facilitate serving a wireless service provider(s) associated with the communication network by facilitating connecting subscribers (e.g., using UE(s) 102) with the wireless service provider(s). The access network 106 can comprise components, such as routers, nodes, switches, interfaces, controllers, etc., that can facilitate communication of data between communication devices in the communication network. In another aspect, the access network 106 can be associated with a core network 108, which can be in the wire-line portion of the communication network, and can facilitate routing data between communication devices, such as UEs 102, allocating resources to UEs 102 in the network, converting or enforcing protocols, establishing and enforcing Quality of Service (QoS) for UEs 102, providing applications or services in the network, translating signals, and/or performing other functions to facilitate system interoperability and communication in the wireless communication network. The core network 108 can comprise gateways, routers, nodes, switches, interfaces, controllers, etc., to facilitate communication between communication devices (e.g., UEs 102) associated with the network.

Conventionally, in a wireless network, the QoS applied or provided to many applications is often "best effort". However, certain applications or services (e.g., video, multimedia) utilized in the wireless network are becoming more data intensive, and a QoS of "best effort" is generally not desirable and/or sufficient for many of these applications or services. Rate adaptation based on network conditions is generally not used for video or certain other applications or services, which are highly sensitive to QoS conditions such as delay/latency, jitter, packet loss, etc. Rate adaptation can be performed at the source (e.g., a video server) of the application or service, but the associated feedback (FB) loop from the radio link to the source can be very long because the source often may be deep in the network (e.g., deep in the wire-line portion of the network), not close to the edge of the wireless portion of the network, and the amount of time for FB communication between the source and radio link increases with an increase in distance between the source and radio link. As a result, often FB adaptation delay can be too large to be effective for fast-changing conditions such as conditions in the RF link (e.g., the rate coding can change, but by the time the change is performed at the other end of the FB loop (e.g., at the source), the RF conditions may have already changed again, so as to make the adapted rate inappropriate by the time it is changed). Another approach could be to bring a full-bandwidth/full rate/full resolution data stream all the way from the source to the wireless edge, however, such an approach at large scale would consume an undesirable (e.g., enormous) amount of bandwidth resources in the wire-line portion of the network. In contrast to conventional systems and techniques, the subject innovation can provide sufficiently fast adaptation time to change conditions, such as data rate, in the wireless portion of a communication network without consuming an undesirable (e.g., enormous) amount of wire-line bandwidth resources.

In accordance with various aspects and embodiments, the subject innovation can control (e.g., adapt, modify, adjust) data rate, or correspondingly rate coding (e.g., a specified rate coding can result in a corresponding data rate), associated with a UE 102, periodically or when triggered, in multiple tiers of the network. In an aspect, the communication network can employ multiple tiers or points (e.g., nodes) where data rates can be respectively controlled at respective adaptation time intervals based at least in part on communication conditions, such as wireless link conditions (e.g., radio link conditions), QoS conditions, data rates, volatility of the radio frequency (RF) link, and/or other communication conditions, associated with the bottom tier, which can be monitored, and/or other information associated with the respective tiers (e.g., maximum recoverable data rate associated with a tier).

In another aspect, the communication network can employ a multi-tier controller 110 that can control setting or adapting the data rate (e.g., output data rate) associated with respective adaptation nodes, such as source adaptation node 112 (e.g., associated with a top tier), which can be located near and connected to a data source 114 (e.g., content provider, video server, multimedia server, etc.) connected to the network, and an edge adaptation node 116 (e.g., associated with a bottom tier), which can be located at or near the base station 104 serving the UE 102, where each adaptation node can be in a respective tier of the multi-tier architecture. In an aspect, the UE 102 and/or base station 104 can provide FB relating to communication conditions, such as the wireless link conditions, QoS, radio link volatility, to the multi-tier controller 110 via the edge adaptation node 116. The multi-tier controller 110 can evaluate the FB information, as well as stored information relating to respective adaptation rates implemented during an applicable adaptation time interval (e.g., data rates implemented for the bottom tier during a last adaptation time interval of a top tier (if no middle tier) can be utilized to facilitate calculating an adapted data rate to be implemented by the top tier during a next adaptation time interval for the top tier), to facilitate respectively controlling the data rates for the respective tiers in the network. The multi-tier rate adapting can be employed with regard to a UE 102 when the UE 102 (e.g., wireless communication device) initiates an application or a service in the communication network and can continue until the UE 102 exits the application or service, for example.

In an aspect, the data rate associated with the bottom tier (e.g., output data rate of the edge adaptation node 116, input data rate of the UE 102) can be determined, for example, using techniques that are well known in the art and based at least in part on FB information regarding communication conditions associated with the UE 102 and/or base station 104. In an aspect, when an application or service is initiated for the UE 102, initially each tier can be set to the data rate initially determined for the bottom tier. For instance, the multi-tier controller 110 operating in conjunction with the source adaptation node 112 can facilitate initially setting the output data rate for the source adaptation node 112 associated with the data source 114 to the initially determined output data rate for the bottom tier, and the multi-tier controller 110 operating in conjunction with the edge adaptation node 116 can facilitate initially setting the output data rate for the edge adaptation node 116, and the input data rate for the UE 102, to the initially determined output data rate for the bottom tier.

As an example embodiment, the communication network can employ a top tier feedback (FB) loop that can adapt the data rate associated with the top tier (e.g., and at or near the data source 114), on a relatively long time scale associated with its longer path transit time for FB communication messages from a wireless portion, or the edge adaptation node 116 at the edge of the wireless portion, to the source adaptation node 112 in the wire-line portion of the network. For instance, the multi-tier controller 110 can employ a long timer that can be associated with the top tier and the data rate associated with the top tier can be re-evaluated and adapted when the time threshold of the long timer is reached (or when adaptation is dynamically triggered as more fully disclosed herein), where the long timer can initially be set to a predefined reset value (e.g., 0) and can adjust (e.g., increment, decrement) until the predefined long time threshold is reached at which time the long timer can reset to the predefined reset value and adaptation of the data rate associated with the top tier can be performed. A bottom tier FB loop can be associated with the base station 104 that is serving the UE 102, where the edge adaptation node 116 can be utilized to set or adapt the data rate at the edge of the wireless portion and wire-line portion of the network (e.g., where the bottom tier begins). The data rate in the bottom tier can be adapted very quickly, and on a shorter time scale than adaptation of rate coding in the top tier FB loop due to its shorter FB path transit time, at the wireless edge and with sufficient speed to accurately adapt to fast-changing wireless conditions associated with the UE 102. For instance, the multi-tier controller 110 can employ a short timer that can be associated with the bottom tier and can have a shorter adaptation time interval than the long timer, and the data rate associated with the bottom tier can be re-evaluated and adapted when the time threshold of the short timer is reached. For instance, the short timer initially can be set to a predefined reset value and can be adjusted (e.g., incremented, decremented) until a predefined short time threshold is reached at which time the short timer can reset to the predefined reset value and adaptation of the data rate associated with the bottom tier can be performed. As a result, the data rate of the bottom tier will be re-evaluated and adapted a number of times, while the top tier can remain at a same data rate, during the adaptation time interval associated with the long timer (unless adaptation is dynamically triggered for the top tier as otherwise described herein).

In an aspect, the multi-tier controller 110 can receive the FB information relating to the communication conditions associated with the UE 102 or base station 104 during the adaptation time interval associated with the top tier. When the adaptation time interval associated with the top tier ends (e.g., when the long time threshold is reached), the multi-tier controller 110 can evaluate the FB information associated with the UE 102 or base station 104 to facilitate determining the adapted data rate for the top tier during the next adaptation time interval of the top tier based at least in part on predefined adaptation criteria. The multi-tier controller 110 can transmit information indicating the adapted rate coding (e.g., corresponding to the desired adapted data rate), which is for the top tier for a next adaptation time interval of the top tier, to the source adaptation node 112, and the source adaptation node 112 can facilitate setting the output data rate for the source adaptation node 112 to the adapted data rate, and data from the data source 114 can be encoded (e.g., employing an encoder-decoder, such as a variable rate codec) in accordance with the adapted data rate for that next adaptation time interval of the top tier. The multi-tier controller also can transmit adapted rate coding information associated with the top tier to the edge adaptation node 116 and the edge adaptation node can set its input data rate to the adapted data rate associated with the top tier (e.g., when there is no middle tier present).

The multi-tier controller 110 also can determine an adapted data rate for the bottom tier for a next adaptation time interval of the bottom tier based at least in part on FB information relating to communication conditions received from the edge adaptation node 116 and the predefined adaptation criteria. The edge adaptation node 116 can receive the FB information from the base station 104 and/or the UE 102 (via the base station 104). The multi-tier controller 110 can transmit the adapted data rate and/or other rate control information for the next adaptation time interval of the bottom tier to the edge adaptation node 116, and the edge adaptation node 116 can facilitate setting the output data rate of the edge adaptation node 116 and the input data rate of the UE 102 to the adapted data rate associated with the bottom tier. Data received from the data source 114 via the source adaptation node 112 can be decoded (e.g., employing an encoder-decoder, such as a variable rate codec) at the edge adaptation node 116 employing its input data rate (e.g., the input data rate can be set based in part on the adaptation data rate for the top tier). The edge adaptation node 116 can encode the data (e.g., decoded data) in accordance with the rate coding associated with the bottom tier, so the output data rate of the edge adaptation node 116 can be at the adapted data rate. The data (as encoded) can be transmitted to the UE 102 via the serving base station 104. The adapted rate coding information associated with the bottom tier can be transmitted to the UE 102 via the serving base station 104 to facilitate setting the input data rate of the ULE 102 to the desired adapted data rate for the adaptation time interval associated with the bottom tier.

In an aspect, the adaptive rate coding of the subject innovation can reduce application resolution and associated bandwidth use when communication conditions (e.g., wireless communication conditions) make such reduction desirable (e.g., conditions require such reduction), and can increase application resolution and associated bandwidth use when communication conditions allow for it. The encoder-decoder(s) (e.g., transcoder, re-coder) (not shown in FIG. 1) employed can be a variable rate codec(s) that can be utilized to facilitate adaptive rate coding of the respective tiers. The encoder-decoder(s) can employ adaptive rate coding provide compression to reduce the amount of bandwidth utilized to transmit the data from the data source 114 or other point in the system 100, where the reduction in bandwidth consumption can thereby improve resource utilization. In another aspect, the encoder-decoder(s) can employ adaptive rate coding to pass the original data stream through, without any compression or manipulation, if the encoder-decoder(s) is not able to sense or determine the type(s) of coding scheme used in the original data stream or as otherwise desired. In still another aspect, the compression of data by the encoder-decoder(s) can be lossless, which can allow the full original source bit rate to be recovered, or lossy, which does not allow the full amount of the original bit rate to be recovered, or some other type of compression, where a desired compression/decompression algorithm (e.g., algorithm based at least in part on the Lempel-Ziv (LZ) compression method, including LZ-Welch, LZ-Renau, or Huffman) can be employed to facilitate compressing or decompressing the data.

In accordance with the subject innovation, as a result of the adaptive multi-tier rate coding, the top tier can provide efficient resource utilization down to the bottom tier, and the bottom tier can provide efficient resource utilization within the wireless portion of the communication network. In accordance with various other aspects and embodiments, one or more middle tiers, which can be associated with one or more intermediate adaptation nodes, can be added as desired to provide a more gradual stepped adaptation from the source (e.g., data source 114) to the destination (e.g., edge adaptation node 116, or UE 102). For example, the communication network can include an intermediate adaptation node(s) (not shown) that can be located in the core network 108 or another desired location(s) in the wire-line portion of the network, where the intermediate adaptation node(s) can be associated with an intermediate timer that can have an intermediate time threshold that is shorter than the long time threshold of the top tier and longer than the short time threshold of the bottom tier to facilitate providing a more gradual stepped adaptation of rates in the network.

In an aspect, the adaptation of the data rates for respective tiers can be based at least in part on the predefined adaptation criteria. The predefined adaptation criteria can relate to, for example, the particular tier for which the data rate is being adapted; the number of tiers in the network; radio link conditions associated with the wireless communication device in the wireless portion of the network; the respective FB loop lengths of the respective tiers; the maximum recoverable data rate from the tier above the tier for which the data rate is being adapted; whether the data rate of the particular tier is being adapted due to a periodic adaptation or a triggered adaptation; average data rate for data rates of a lower tier (e.g., tier immediately beneath the tier being adapted) ranging from top tier to lower tier) during a most recent adaptation time interval associated with the tier being adapted, trending data rate for a lower tier (e.g., tier immediately beneath the tier being adapted, ranging from top tier to lower tier) during a most recent adaptation time interval associated with the tier being adapted, the margin employed for a particular tier, and/or other adaptation criteria.

For example, the multi-tier controller 110 can obtain FB information regarding communication conditions of a tier (e.g., a middle tier, if any; bottom tier if there is no middle tier) directly beneath the top tier in the multi-tier architecture during the last adaptation time interval associated with the top tier and can determine a rate coding or data rate for the top tier, where the data source 114 is located, based at least in part on the FB information. For instance, FB information can comprise various data rates implemented by the tier directly beneath the top tier during the last adaptation time interval associated with the top tier. The multi-tier controller 110 can average data rates of the tier directly beneath the top tier, or can employ a trend algorithm that can determine the trending of data rates for the tier directly beneath the top tier during the last adaptation time interval associated with the top tier, and can determine an adapted data rate and corresponding rate coding associated with the top tier, for the next adaptation time interval of the top tier, based at least in part on the calculated average data rate or determined trending data rate for the tier underneath the top tier. In an aspect, the multi-tier controller 110 can adjust (e.g., increase) the determined or calculated data rate for a tier (e.g., and a communicating component in the tier), such as the top tier (e.g., and/or any middle tiers employed in the multi-tier implementation), by a margin amount respectively applicable to the top tier, which can be determined based at least in part on the predefined adaptation criteria (e.g., volatility of the radio link associated with the bottom tier), and can be determined (e.g., dynamically determined), for example, based at least in part on a percentage of the determined or calculated data rate or a specified amount of adjustment from the determined or calculated data rate for the tier, where there can be respective margins employed for each tier, as desired.

In an aspect, the margin for a given tier (e.g., top tier, middle tier) can be calculated based at least in part on the predefined adaptation criteria. ). For example, the amount of margin can be determined based in part on network resources (e.g., the amount of available network resources) and frequency of triggering re-adaptation of data rate in a given tier. For instance, there can be a tradeoff between the amount of margin used, where the higher the margin amount the more network resources that are used (e.g., the higher the margin amount in an upper tier, the more network resources that are used), and the frequency of triggered re-adaptations of the data rate of the higher tier(s), where the higher the frequency of triggered re-adaptations the more computations and overhead signaling traffic that occur. In accordance with various aspects, respective amounts of margin applicable for respective data rates and/or respective tiers can be stored in a table in a database of the multi-tier controller 110 or in another component, or can be calculated by the multi-tier controller 110.

In another aspect, the amount of margin for a given tier can be dynamically determined, calculated, or inferred based at least in part on current or historical communication conditions associated with the tier (e.g., bottom tier) below the given tier and/or the given tier, and the predefined adaptation criteria. As one non-limiting example, if an amount of margin for a given tier is determined as a function of the amount of the preliminary data rate as calculated over the last adaptation time interval for the given tier (e.g., percentage of the preliminary data rate for the given tier), but the multi-tier controller 110 (e.g., or an intelligent component (not shown)) observes that historically such a margin amount has been resulting in an undesirable frequency of triggering of re-adaptations of the data rate for the given tier, the multi-tier controller 110 can dynamically determine, calculate, or infer a desired amount of margin (e.g., different from the percentage of the preliminary data rate) to be utilized to adjust the preliminary data rate to the adapted data rate to be used by the given tier over the next adaptation time interval.

In yet another aspect, the multi-tier controller 110 can trigger the top tier (e.g., and communicating components or other components therein) (and/or a middle tier(s)) to re-adapt the data rate, even if the time threshold associated with the top tier has not been reached (e.g., long adaptation time interval has not ended), based at least in part on the predefined adaptation criteria, wherein the predefined adaptation criteria can indicate triggering re-adapting a data rate associated with the top tier (and/or a middle tier(s)) when the data rate desired by the bottom tier changes (e.g., increases) to a predetermined data rate, or the rate of change of the data rate for the bottom tier meets or exceeds a predetermined threshold rate of change, or the difference between a newly adapted data rate and the previous data rate associated with the bottom tier meets or exceeds a predetermined rate differential threshold.

In accordance with various aspects and embodiments, the multi-tier architecture can be employed in a wire-line communication network (e.g., having no wireless portion of the network), such as a communication network that employs digital subscriber line (DSL), T-1, E-1, T-3, E-3, digital signal 0(DS0), E-0, frame relay, synchronous optical networking (SONET), asynchronous transfer mode (ATM), Internet Protocol (IP) routing, multi-protocol label switching (MPLS), optical transmission, cable, etc., where the wire-line communication network can be divided into a desirable number of multiple tiers. Multiple adaptation nodes can be distributed between a communication device providing data and a communication device receiving the data in the wire-line communication network, and the data rates and corresponding rate coding associated with the respective adaptation nodes can be adapted based at least in part on the predefined adaptation criteria. In accordance with various other aspects and embodiments, the multi-tier architecture can be employed in a wireless communication network, such as a communication network that employs global system for mobile communications (GSM), code division multiple access (CDMA), Long Term Evolution (LTE), 3G cellular, 4G cellular, ad-hoc networks, mesh networks, etc., where the wireless communication network can be divided into a desirable number of multiple tiers. Multiple adaptation nodes can be distributed between a communication device providing data (e.g., data source 114) and a communication device receiving the data (e.g., UE 102) in the wireless communication network, and the data rates or rate coding of the respective adaptation nodes can be adapted based at least in part on the predefined adaptation criteria.

In accordance with various other aspects and embodiments, the multi-tier architecture can be employed in mixed wireless-wireline communication networks (e.g., where, in addition to data flowing down from a data source to a UE, data can flow up to a central core and then back to a UE). For example, a data source (e.g., 114) can be connected to a wire-line edge network portion (e.g., T3, . . . ) of a communication network attached to a wire-line access network portion (e.g., SONET, . . . ), which can be attached to a wire-line core network portion (e.g., MPLS, . . . ) that is attached to an access/backhaul wire-line network portion (e.g., Metro Ethernet, ATM, . . . ), which can be attached to an edge wireless network (e.g., GSM, LTE, . . . ), where a wireless UE (e.g., 102) can be connected, and where data can be communicated between the data source and UE. In an aspect, the five network portions can be used as five separate tiers, or some portions can be combined into a tier to result in less than five tiers, as desired. It is to be appreciated and understood that the above example is one non-limiting example and the subject innovation is not so limited, as virtually any desired multi-tier configuration having virtually any desired number of tiers can be employed in a wire-line communication network, a wireless communication network, or communication network comprising a wire-line portion(s) and wireless portion(s), to facilitate multi-tiered re-coding for data communications.

The subject innovation, by employing multi-tiered re-coding, can facilitate avoiding or reducing dropped connections via fast wireless adaptation, while improved utilization of overall network resources can be simultaneously provided by multiple tiers of adaptation, and thus can provide more efficient and improved communication in a communication network as compared to conventional systems and techniques. Also, the subject innovation can provide improved conservation of wire-line resources of the network, based at least in part on current calculated (e.g., averaged) needs of the wireless communication device of the user, as compared to conventional systems and techniques. Moreover, the subject innovation is flexible in that virtually any desired number of tiers can be employed, where adding tiers can improve and/or smooth the transition between the data source (e.g., media server) of the top tier, which adapts rate coding more slowly, and the bottom tier that is associated with the wireless portion of the network and is adapted more often than the top tier, and an optimal number of tiers can be readily determined for implementation.

It is to be appreciated and understood that the subject innovation is depicted in FIG. 1 as having one UE 102, one base station 104, one source adaptation node 112, one data source 114, and one edge adaptation node 116; however, the subject innovation is not so limited, as there also can be more than one UE 102, base station 104, source adaptation node 112, data source 114, or edge adaptation node 116, as desired. Further, while the source adaptation node 112 is depicted as being associated with one data source 114 and edge adaptation node 116 is depicted as being associated with one base station 104 and one UE 102, it is to be appreciated and understood that one or more UEs 102 can be associated with the base station 104 and/or edge adaptation node 116; UEs 102 respectively associated with disparate base stations 104 can be associated with the same edge adaptation node 116; and/or one or more data sources 114 can be associated with the same source adaptation node 112. It is to be further appreciated and understood that, while the multi-tier controller 110 is shown as being a stand-alone unit, the subject innovation is not so limited, as, in accordance with various embodiments, portions (e.g., components) of the multi-tier controller 110 can be distributed across the multiple tiers associated with the system 100, as desired.

In accordance with one embodiment of the subject innovation, one or more components (e.g., multi-tier controller 110) in the network can utilize artificial intelligence (AI) methods to infer (e.g., reason and draw a conclusion based at least in part on a set of metrics, arguments, or known outcomes in controlled scenarios) a data rate or corresponding rate coding to be applied to components associated with a particular tier; whether to dynamically trigger re-adaptation of a data rate associated with a tier (e.g., top tier); one or more communication conditions associated with a tier; amount of margin to be employed for an adaptation of a data rate of a given tier; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with system 100 to facilitate rendering an inference(s) related to the system 100.

In particular, the one or more components in the network can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of the historic and/or current data associated with system 100 to facilitate making inferences or determinations related to system 100.

Figure 2:
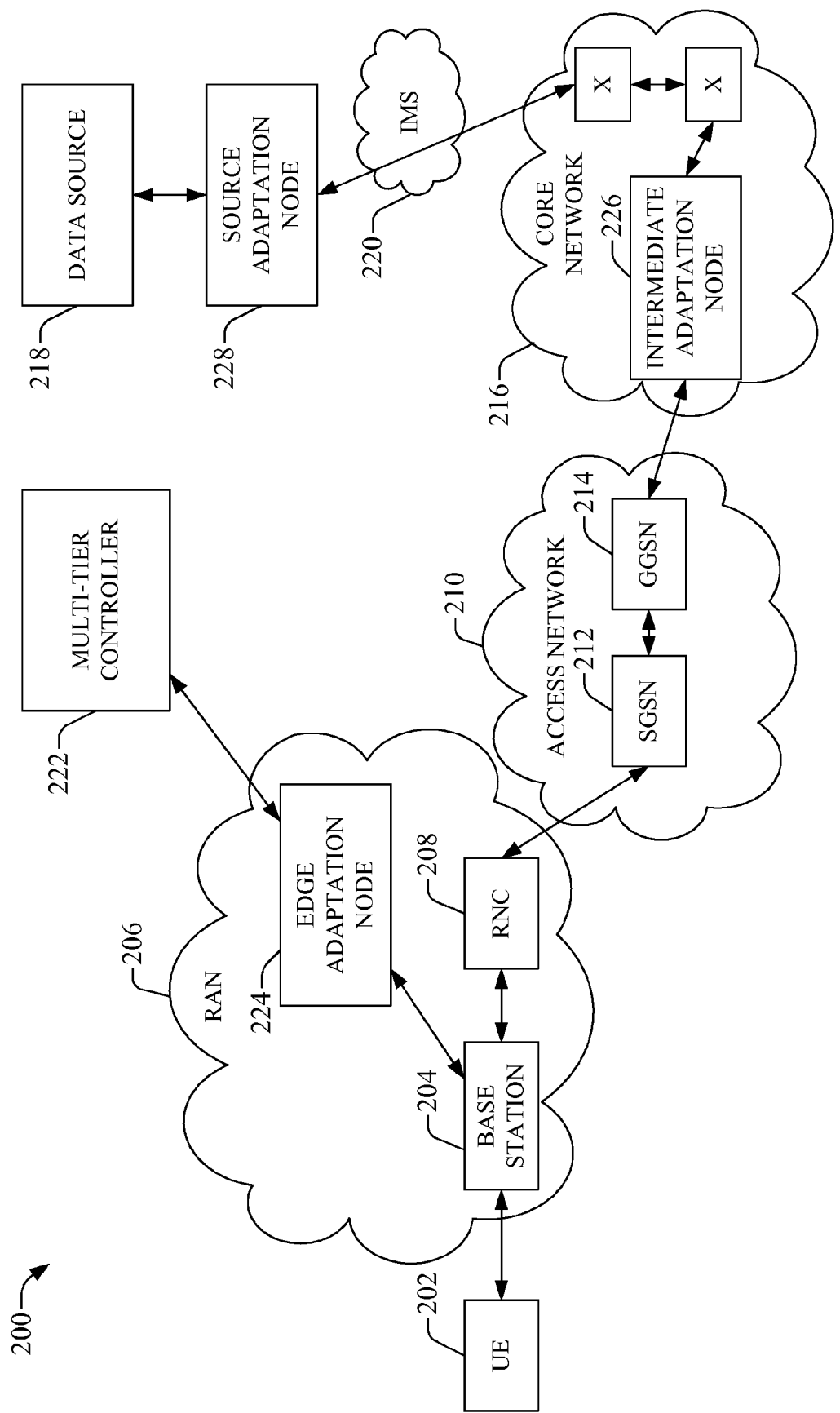
FIG. 2 is a block diagram of an example system that can perform rate adaptation of multiple tiers in a communication network in accordance with an embodiment of the disclosed subject matter.

FIG. 2 is a block diagram of an example system 200 that can perform rate adaptation of multiple tiers in a communication network in accordance with an embodiment of the disclosed subject matter. The example system 200 can respectively control rate coding of respective tiers of the multi-tier architecture to facilitate fast adaptation of rate coding in a wireless portion of the network to provide desired QoS for applications or services utilized by wireless communication devices, which can avoid or reduce dropped connections with wireless communication devices, while simultaneously improving utilization of overall network resources.

The example system 200 can comprise a UE 202 (e.g., mobile communication device, such as a mobile phone (e.g., 3GPP UMTS phone); personal digital assistant (PDA); computer; IP television (IPTV); set-top box; etc.) in a communication environment (e.g., communication environment comprising a wireless portion and a wire-line portion of a communication network; communication environment comprising a wire-line portion of a communication network). The UE 202 can be located in the wireless portion (e.g., region) of the communication network, for example. The UE 202 can be connected (e.g., wirelessly connected) to a base station 204 to facilitate communication in the wireless communication environment. The base station 204 can serve a coverage macro cell that can cover a specified area, and the base station 204 can service wireless devices (e.g., wireless mobile devices), such as UE 202, in the area covered by the macro cell, where such coverage can be achieved via a wireless link (e.g., UL, DL). When an attachment attempt is successful, UE 202 can be served by base station 204 and incoming voice and data traffic can be paged and routed to the UE 202 through the base station 204, and outgoing voice and data traffic from the UE 202 can be paged and routed through the base station 204 to other communication devices (e.g., another UE (not shown)). The base station 204 can be located at the edge of a wire-line portion and the wireless portion of the communication network.

In an aspect, the system 200 can include a radio access network (RAN) 206, such as a high-speed packet access (HSPA) RAN, that can be utilized to facilitate communication between communication devices, such as the UE 202, associated with or in the wireless portion of the network. The base station 204 can be in or associated with the RAN 206. The RAN 206 also can contain a radio network controller (RNC) 208 that can facilitate controlling routing of data between the base station 204 (or other base stations in or associated with the RAN 206) and an access network 210 (e.g., a wire-line access network).

The access network 210 can be in the wire-line portion of the communication network and can facilitate serving a wireless service provider(s) associated with the communication network by facilitating connecting subscribers (e.g., using UE(s) 202) with the wireless service provider(s). The access network 210 can include a serving GPRS support node (SGSN) 212, which can be associated with the RNC 208 to facilitate communication of data, in accordance with specified protocols, between the RAN 206 and access network 210. The access network 210 also can comprise other components, such as routers, nodes, switches, interfaces, controllers, etc., that can facilitate communication of data between communication devices in the communication network. The access network 210 can further contain a gateway GPRS support node 214 that can facilitate communication of data between the access network 210 and a core network 216.

The core network 216 also can be in the wire-line portion of the communication network and can facilitate routing data between communication devices, such as UEs 202 and/or data sources 218, allocating resources for UEs 202 in the network, establishing and enforcing QoS for UEs 202, providing applications or services in the network, etc. The core network 216 also can comprise gateways, routers, nodes, switches, interfaces, controllers, etc., to facilitate communication between communication devices (e.g., UEs 202) associated with the network. The core network 216 can be associated with a data source 218 via an IP multimedia subsystem (IMS) 220 (e.g., 3GPP), where the data source can be a server, a computer, or other communication device that can provide data (e.g., video content, audio content, multimedia content, textual content, etc.) to communication devices, such as UE 202, associated with the communication network.

In accordance with an aspect, the system 200 can comprise a multi-tier controller 222 that can respectively control respective data rates in each tier of the multi-tier architecture of the communication network. System 200 also can include an edge adaptation node 224, intermediate adaptation node 226, and source adaptation node 228, which can be associated with (e.g., connected to) the multi-tier controller 222. The edge adaptation node 224 can be in or associated with the RAN 206 and can be associated with the base station 204 to facilitate obtaining FB information regarding communication conditions associated with the UE 202 from the base station 204 and/or ULE 202 (via the base station 204), and the FB information can be communicated to the multi-tier controller 222 to facilitate determining respective adapted rate codings for the tiers (e.g., bottom tier, intermediate or middle tier, top tier). The edge adaptation node 224 can receive information, including rate coding information, from the multi-tier controller 222, which can be utilized to set or adapt the input data rate to and output data rate from an encoder-decoder (not shown) associated with the edge adaptation node 224, and the input data rate for the UE 202. The edge adaptation node 224 can be located in or associated with the bottom tier.

The intermediate adaptation node 226 can be in or associated with the core network 216, and can be associated with other components in the core network 216 and the GGSN 214 in the access network 210. The intermediate adaptation node 226 can receive information, including rate coding information, from the multi-tier controller 222, which can be utilized to set or adapt the input data rate to and output data rate from an encoder-decoder (not shown) associated with the intermediate adaptation node 226. The intermediate adaptation node 226 can be located in or associated with the middle tier.

The source adaptation node 228 can be associated with the data source 218 and the core network 216. The source adaptation node 228 can receive information, including rate coding information, from the multi-tier controller 222, which can be utilized to set or adapt the output data rate from an encoder-decoder (not shown) contained in or associated with the source adaptation node 228. The source adaptation node 228 can be located in or associated with the top tier of the communication network.

In accordance with various aspects, UE 202, base station 204, the multi-tier controller 222, edge adaptation node 224, intermediate adaptation node 226, source adaptation node 228, and other components in system 200, respectively can comprise the same or similar features and functionality as respective components described more fully herein, for example, with regard to system 100.

In an aspect, when an application or service is initiated and data is to be communicated between the data source 218 and UE 202, the multi-tier controller 222 can receive the FB information relating to the communication conditions (e.g., RF link, bandwidth, QoS, etc.) associated with the UE 202 and can determine an initial data rate (e.g., corresponding to an initial rate coding) to be employed in the bottom tier (associated with the UE 202) based at least in part on the FB information regarding the communication conditions and the predefined adaptation criteria. The data rate associated with the bottom tier (e.g., data rate to be employed by the UE 202 at its input and the edge adaptation node 224 at its output) can be set to the determined data rate for the bottom tier. At the end of each short adaptation time interval (e.g., when a short time threshold has been reached), the multi-tier controller 222 can adaptively determine and set the data rate associated with the bottom tier to a new data rate (which can be the same data rate or a different data rate from the previous data rate) associated with the bottom tier based at least in part on the FB information relating to the communication conditions associated with the UE that is received by the multi-tier controller 222 during the short adaptation time interval that has just ended. The edge adaptation node 224 can facilitate implementing the desired rate coding, corresponding to the desired data rate, for example, by employing an encoder-decoder (e.g., variable rate codec) to encode data in accordance with the rate coding so that the output data rate is the desired adapted data rate associated with the bottom tier, and facilitating communication of the rate coding information to the UE 202 so the UE 202 can set its input data rate to the desired data rate associated with the bottom tier. The edge adaptation node 224 also can decode data received from an adaptation node of an upper tier (e.g., intermediate adaptation node 226) in accordance with a current rate coding associated with that upper tier.

In another aspect, the multi-tier controller 222 initially can set the data rate associated with the middle tier (e.g., output data rate from the intermediate adaptation node 226) to the same data rate associated with the bottom tier, or another data rate, as desired, based at least in part on the predefined adaptation criteria. At the end of each intermediate adaptation time interval (or when dynamically triggered to re-adapt a data rate, for example, as described herein), the multi-tier controller 222 can adaptively determine (e.g., calculate) and set a new data rate (which can be the same data rate or a different data rate from the previous data rate) associated with the middle tier based at least in part on the various data rates associated with (e.g., implemented in) the bottom tier during the intermediate adaptation time interval that has just ended and the predefined adaptation criteria. For example, the various data rates employed for the bottom tier (e.g., for the output data rate of the edge adaptation node 224) during the last intermediate adaptation time interval can be averaged (or a trending data rate determined) and a desired margin amount, applicable for the middle tier, can be applied to adjust the average data rate (or trending data rate) to determine a new adapted data rate associated with the middle tier during the next intermediate adaptation time interval. In an aspect, the intermediate adaptation node 226 can facilitate implementing the desired rate coding, corresponding to the desired data rate, for example, by employing an encoder-decoder to encode data in accordance with the adapted rate coding associated with the intermediate tier so that the output data rate of the intermediate adaptation node 226 is the desired adapted data rate associated with the middle tier. The intermediate adaptation node 226 also can decode data received from an adaptation node of an upper tier (e.g., top tier) in accordance with a current rate coding associated with that upper tier.

In still another aspect, the multi-tier controller 222 initially can set the data rate associated with the top tier (e.g., data rate output from the source adaptation node 228 that receives data from a data source 218 communicating data to the UE 202) to the same data rate associated with the bottom tier, or another data rate, as desired, based at least in part on the predefined adaptation criteria. At the end of each long adaptation time interval (or when dynamically triggered to re-adapt a data rate, for example, as described herein), the multi-tier controller 222 can adaptively determine and set a new data rate (which can be the same data rate or a different data rate from the previous data rate) associated with the top tier based at least in part on the various data rates associated with (e.g., implemented in) the middle tier during the long adaptation time interval that has just ended and the predefined adaptation criteria. For example, the various data rates employed for the middle tier (e.g., for the output data rate of the intermediate adaptation node 226) during the last long adaptation time interval can be averaged (or a trending data rate determined) and a desired margin amount, applicable to the top tier, can be applied to adjust the average data rate (or trending data rate) to determine a new data rate associated with the top tier during the next long adaptation time interval. In an aspect, the source adaptation node 228 can facilitate implementing the desired rate coding, corresponding to the desired data rate, for example, by employing an encoder-decoder to encode data in accordance with the adapted rate coding associated with the top tier so that the output data rate of the source adaptation node 228 is the desired adapted data rate associated with the top tier.

It is to be appreciated and understood that, while system 200 employs three tiers, the subject innovation is not so limited, as, in accordance with the subject innovation, there can be less than three tiers, three tiers, or more than three tiers as desired. For instance, in accordance with the subject innovation, there can be a bottom tier, a top tier, and zero, one or more middle tiers employed in the communication network.

It also is to be appreciated and understood that the subject innovation is depicted in FIG. 2 as having one UE 202, one base station 204, one data source 218, one edge adaptation node 224, one intermediate adaptation node 226, and one source adaptation node 228; however, the subject innovation is not so limited, as there also can be more than one UE 202, base station 204, data source 218, edge adaptation node 224, intermediate adaptation node 226, and/or source adaptation node 228, as desired. Further, while the source adaptation node 228 is depicted as being associated with one data source 218 and edge adaptation node 224 is depicted as being associated with one base station 204 and one UE 202, it is to be appreciated and understood that one or more UEs 202 can be associated with the base station 204 and/or edge adaptation node 224; UEs 202 respectively associated with disparate base stations 204 can be associated with the same edge adaptation node 224; and/or one or more data sources 218 can be associated with the same source adaptation node 228. Moreover, there can be one middle tier (as depicted), no middle tier, or more than one middle tier as desired, where each middle tier (if any) can include one or more intermediate adaptation nodes 226. It is to be further appreciated and understood that, while the multi-tier controller 222 is shown as being a stand-alone unit, the subject innovation is not so limited, as, in accordance with various embodiments, portions (e.g., components) of the multi-tier controller 222 can be distributed across the multiple tiers associated with the system 200, as desired.

Figure 3:
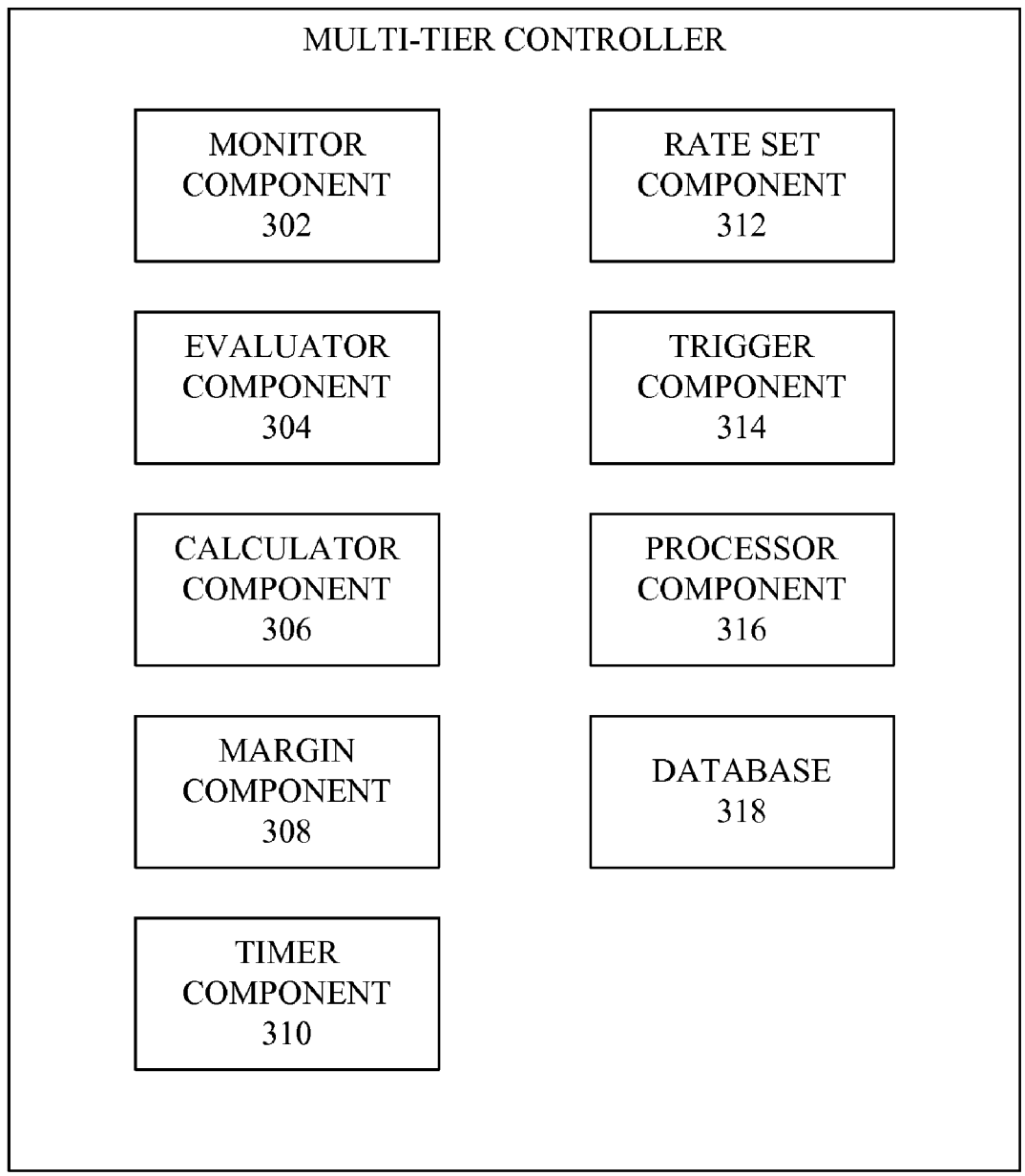
FIG. 3 depicts a block diagram of an example multi-tier controller in accordance with an aspect of the disclosed subject matter.

FIG. 3 depicts a block diagram of an example multi-tier controller 300 in accordance with an aspect of the disclosed subject matter. In an aspect, the multi-tier controller can be utilized to control rate coding in respective tiers of a communication network having multiple tiers (e.g., bottom tier at the edge of a wireless portion of the network, top tier at or near a data source in a wire-line portion of the network, and/or one or more middle tiers in other locations in the wire-line network). The multi-tier controller 300 can include a monitor component 302 that can monitor, detect, and receive FB information related to communication conditions associated with communication devices, such as UEs (e.g., 102, 202), in the communication network (e.g., wireless portion of the network; wire-line network, or portion thereof).

The multi-tier controller 300 also can comprise an evaluator component 304 that can evaluate the FB information related to communication conditions associated with a communication device(s) based at least in part on predefined adaptation criteria to facilitate determining respective data rates or corresponding rate codings for each tier at respective times the respective data rate for each tier is to be adapted. The evaluator component 304 can operate in conjunction with a calculator component 306 that can calculate data rates for respective tiers of the network at respective times in accordance with the predefined adaptation criteria. For example, the calculator component 306 can evaluate the various data rate adaptations that occurred for a tier directly below another tier (e.g., in the hierarchy) during the adaptation time interval associated with the another tier and can calculate the average data rate for the tier directly below during that adaptation time interval, and an adapted data rate for the other tier can be determined or calculated as a function of the calculated average rate of the tier directly below. As another example, the evaluator component 304 and 306 can operate in conjunction to evaluate the FB information to determine a trend in the data rate for a tier directly below another tier during the adaptation time interval associated with the other tier, and the calculator component 306 can calculate the trending data rate for the tier directly below during that adaptation time interval, and an adapted data rate for the other tier can be determined or calculated as a function of the trending data rate of the tier below. For instance, the calculator component 306 can employ a trending algorithm that, for a subset of data rates for the tier directly below during the adaptation time interval of the other tier above, can weight the more recent data rates in the subset more heavily than the other data rates in the subset to facilitate determining a trending data rate that can be used to calculate an adapted data rate for the other tier above. It is to be appreciated that there are a variety of algorithms that can be employed, as desired, to facilitate determining an adapted data rate for a tier, and such algorithms are intended to be and are within the scope of the subject innovation.

In another aspect, the multi-tier component 300 can contain a margin component 308 that can operate in conjunction with the calculator component 306 to calculate respective data rates (and corresponding rate codings) to be applied to respective tiers of the network at respective times. The margin component 308 can determine or provide, or be used to determine or provide, a margin amount of rate to be applied to a calculated (or preliminary) data rate (e.g., average data rate, trending data rate) to adjust (e.g., increase) the calculated data rate to determine the adapted data rate for a particular tier. The margin amount of rate can range from 0 to virtually any desired amount feasible for the communication network. The margin amount of rate can be determined as a function of a percentage of the calculated data rate (e.g., margin=y %×calculated data rate, and adapted data rate=calculated data rate+margin), or can be a specified margin amount, for example. In an aspect, a respective margin amount can be applied to respective tiers, where a margin amount applied to one tier can be the same or different from a margin amount applied to another tier.

For instance, the margin for a given tier (e.g., when a positive value) can be utilized to provide a "margin of safety" so that the data rate supplied to the next lower tier (e.g., bottom tier whose data rate changing rapidly and may increase more than expected) is more likely to be sufficient for that lower tier during the adaptation interval of the given tier than a lower margin amount or no margin (e.g., the data rate of the given tier is less likely to need to be triggered to adapt to a higher data rate in order to support the data rate desired by the lower tier). In determining the amount of margin, there can be a tradeoff between the amount of margin used, where the higher the margin amount the more network resources that are used (e.g., the higher the margin amount in an upper tier, the more network resources that are used), and the frequency of triggered re-adaptations of the data rate of the higher tier(s), where the higher the frequency of triggered re-adaptations the more computations and overhead signaling traffic that occur. The amount of margin can be determined based at least in part on the predefined adaptation criteria, where the predefined adaptation criteria can account for various factors, including the tradeoff between the amount of margin for a given tier (e.g., middle tier, top tier) and the frequency of re-adaptation of the data rate of given tier (or higher tiers).

The multi-tier controller 300 also can comprise a timer component 310 that can be utilized to track time for each adaptation time interval for each tier of the multiple tiers employed in the communication network. The timer component 310 can employ respective timers (e.g., short timer for bottom tier, intermediate timer for a middle tier, long timer for a top tier) that can have respective time thresholds set or adjusted, as desired, for respective tiers. The timer can increment (or decrement, as desired) from a predefined reset value (e.g., 0) towards the time threshold, and when the time threshold of a timer is met, the timer can reset to the predefined reset value, and the multi-tier controller 300 can adapt the data rate for the tier associated with that timer. In an alternative embodiment, a timer can be set or re-set to a time threshold and can decrement down to a predefined value (e.g., 0) and re-set to the applicable time threshold at that point, as desired. In another aspect, the multi-tier controller 300 can include a rate set component 312 that can communicate rate coding information for respective tiers to respective adaptation nodes (e.g., edge adaptation node, source adaptation node) to facilitate controlling or respectively adapting data rates in each tier at desired times.

The multi-tier controller 300 further can include a trigger component 314 that can automatically and dynamically trigger adaptation of a data rate or rate coding for a tier, such as a top tier or intermediate tier, even when the time threshold for adaptation of the data rate for that tier has not yet been reached, based at least in part on predefined adaptation criteria. For instance, if the data rate associated with the bottom tier changes (e.g., increases) by a predetermined threshold amount or percentage over a specified period of time or specified number of adaptation cycles, the evaluator component 304, operating in conjunction with the trigger component 314, can determine that the data rate associated with an upper tier (e.g., top tier) is to be dynamically re-adapted, and the trigger component 314 can dynamically trigger adaptation of the data rate of the upper tier. The rate set component 312 can communicate the rate coding for the triggered adaptation to the desired upper tier to facilitate dynamically adapting the data rate for that tier.

In another aspect, the multi-tier controller 300 can comprise a processor component 316 that can work in conjunction with the other components (e.g., evaluator component 302, calculator component 306, etc.) to facilitate performing the various functions of the multi-tier controller 300. The processor component 316 can employ one or more processors, microprocessors, or controllers that can process data, such as FB information regarding communication conditions, and can control data flow between the multi-tier controller 300 and adaptation nodes or other components associated with the multi-tier controller 300.

The multi-tier controller 300 also can include a database 318 that can store data structures (e.g., user data, metadata); code structure(s) (e.g., modules, objects, classes, procedures) or instructions; predefined adaptation criteria; FB information from respective tiers; current and historical adaptation rates respectively associated with each tier; network or device information like policies and specifications, attachment protocols; code sequences for scrambling, spreading and pilot (e.g., reference signal(s)) transmission; frequency offsets; cell IDs; and so on. In an aspect, the processor component 316 can be functionally coupled (e.g., through a memory bus) to the database 318 in order to store and retrieve information (e.g., information relating to the predefined adaptation criteria, algorithms used to determine rate coding or data rates, time threshold information, stored FB information, etc.) desired to operate and/or confer functionality, at least in part, to monitor component 302, evaluator component 304, calculator component 306, margin component 308, timer component 310, rate set component 312, trigger component, 314, and/or substantially any other operational aspects of the multi-tier controller 300.

Figure 4:
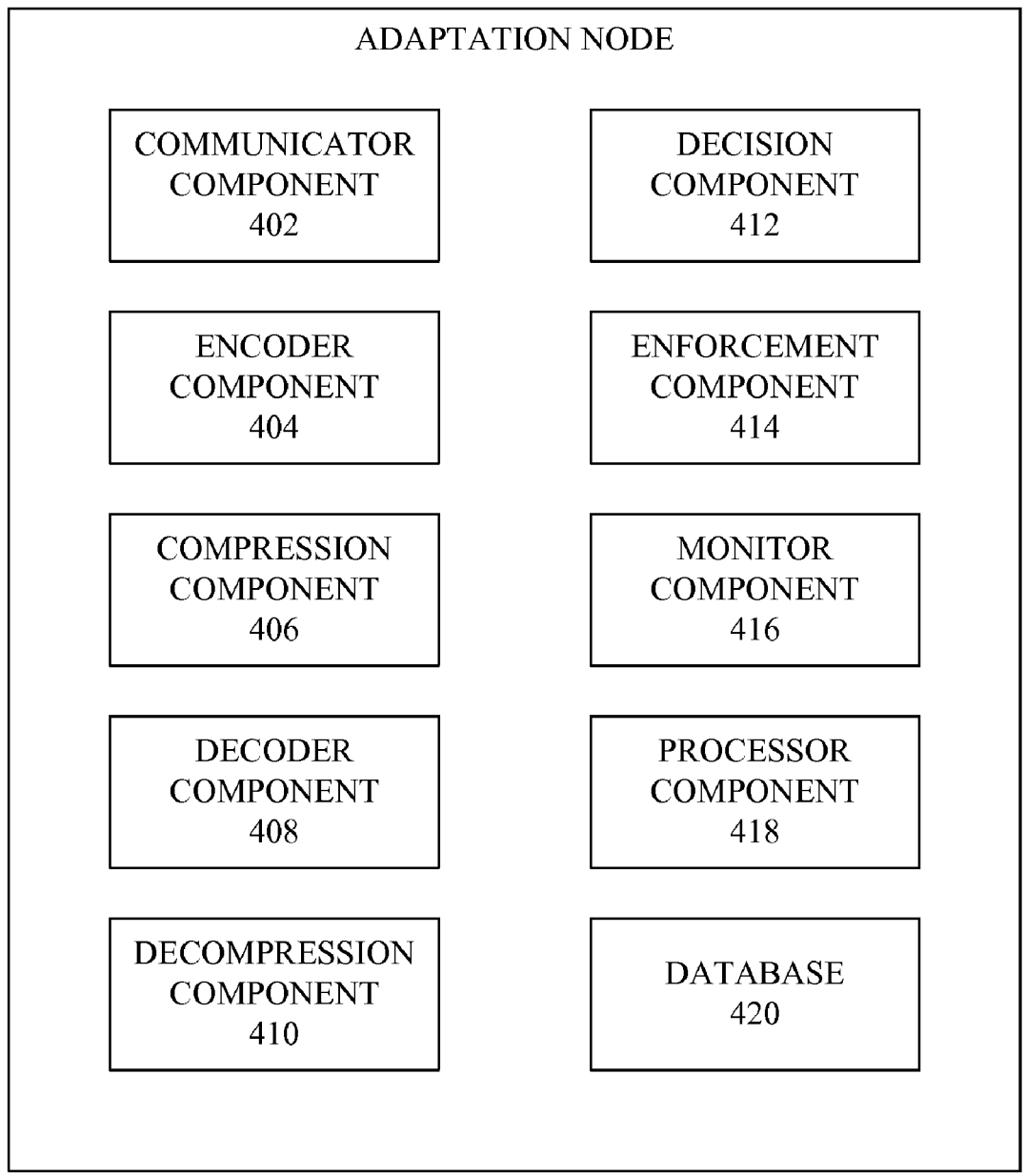
FIG. 4 illustrates a block diagram of an example adaptation node that can be utilized to facilitate adaptation of data rate or rate coding of a tier in a multi-tier architecture of a communication network in accordance with an aspect of the disclosed subject matter.

FIG. 4 illustrates a block diagram of an example adaptation node 400 that can be utilized to facilitate adaptation of rate coding of a tier in a multi-tier architecture of a communication network in accordance with an aspect of the disclosed subject matter. The adaptation node 400 can be an edge adaptation node when it is associated with a bottom tier, a source adaptation node when the adaptation node is associated with a top tier, or an intermediate adaptation node when it is associated with an intermediate tier, for example. The adaptation node 400 can include a communicator component 402 that can facilitate communication (e.g., transmission, reception) of data between the adaptation node 400 and other components, such as a data source, a base station, a multi-tier controller, components in the core network, to facilitate adapting rate coding or data rates for the tier in which the adaptation node 400 resides or is associated.

In an aspect, the adaptation node 400 can contain an encoder 404 that can encode data in accordance with an encoding algorithm, and can operate in conjunction with a compression component 406 to compress data in accordance with a desired rate coding or data rate using a desired compression algorithm, where the compression can be lossless or lossy. The adaptation node 400 can contain a decoder 408 that can decode data in accordance with an decoding algorithm (which can correspond to the encoding algorithm used to encode the data), and can operate in conjunction with a decompression component 410 to decompress data in accordance with a desired rate coding or data rate using a desired decompression algorithm (which can correspond with the compression algorithm employed to compress the data). For example, the adaptation node 400 can employ an encoder-decoder, such as a variable rate codec, to perform at least a portion of the functions of the encoder component 404, compression component 406, decoder component 408, or decompression component 410.

In still another aspect, the adaptation node 400 can comprise a decision component 412 (e.g., policy decision function (PDF)) that can make decisions relating to adaptation of rate coding or data rates and/or relating to other policies associated with the associated tier, such as decisions related to QoS, the rate coding or data rate to implement, or which compression algorithm or decompression algorithm to employ, for example, where the decisions can be made in accordance with predefined rules, such as predefined adaptation rules, based at least in part on the predefined adaptation criteria, and/or information (e.g., commands, instructions) received from the multi-tier controller.

In yet another aspect, the adaptation node 400 can include an enforcement component 414 (e.g., policy enforcement function (PEF)) that can enforce decisions or implement actions based in part on decisions (e.g., policy decisions) made by the decision component 412. The decision component 412 can communicate decisions it has made or instructions related to the decisions made, and the enforcement component 414 can operate in conjunction with other components within the adaptation node 400 or other components (e.g., base station, data source, etc.) associated with the adaptation node 400. For example, the enforcement component 414 can operate in conjunction with the encoder component 404 and compression component 406 to implement an adapted data rate or rate coding for the associated tier in accordance with a decision made by the decision component 412.

In an aspect, the adaptation node 400 optionally can comprise a monitor component 416 that can monitor, detect, and receive FB information related to communication conditions associated with a communication device (e.g., UE) in the communication network. For example, the adaptation node 400 can be an edge adaptation node associated with a bottom tier that can monitor and receive FB information related to communication conditions associated with a UE connected to a base station associated with the adaptation node 400 to facilitate adapting data rates respectively in all tiers, from the tier associated with the UE to the tier associated with the data source being accessed by the UE, in the communication network. As desired, the monitor component 416 can be omitted from adaptation node 400 when the adaptation node 400 is associated with a middle tier or top tier.

The adaptation node 400 also can contain a processor component 418 that can operate in conjunction with the other components (e.g., communicator component 402, encoder component 404, compression component 406, decoder component 408, decompression component 410, decision component 412, enforcement component 414, monitor component 416, etc.) to facilitate performing the various functions of the adaptation node 400. The processor component 418 can employ one or more processors, microprocessors, or controllers that can process data, such as FB information regarding communication conditions associated with a UE, and can control data flow between the multi-tier controller and the adaptation node 400 or other components associated with the adaptation node 400.

The adaptation node 400 also can contain a data store 420 that can store data structures (e.g., user data, metadata); code structure(s) (e.g., modules, objects, classes, procedures) or instructions; rate coding information for the adaptation node and/or components (e.g., UE) associated therewith); FB information regarding communication conditions associated with a UE or other component; network or device information like policies and specifications, attachment protocols; code sequences for scrambling, spreading and pilot (e.g., reference signal(s)) transmission; frequency offsets; cell IDs; and so on. In an aspect, the processor component 418 can be functionally coupled (e.g., through a memory bus) to the data store 420 in order to store and retrieve information (e.g., rate coding information, the FB information, encoding/decoding or compression/decompression algorithms, etc.) desired to operate and/or confer functionality, at least in part, to communicator component 402, encoder component 404, compression component 406, decoder component 408, decompression component 410, decision component 412, enforcement component 414, monitor component 416, and/or substantially any other operational aspects of the adaptation node 400.

Figure 5:
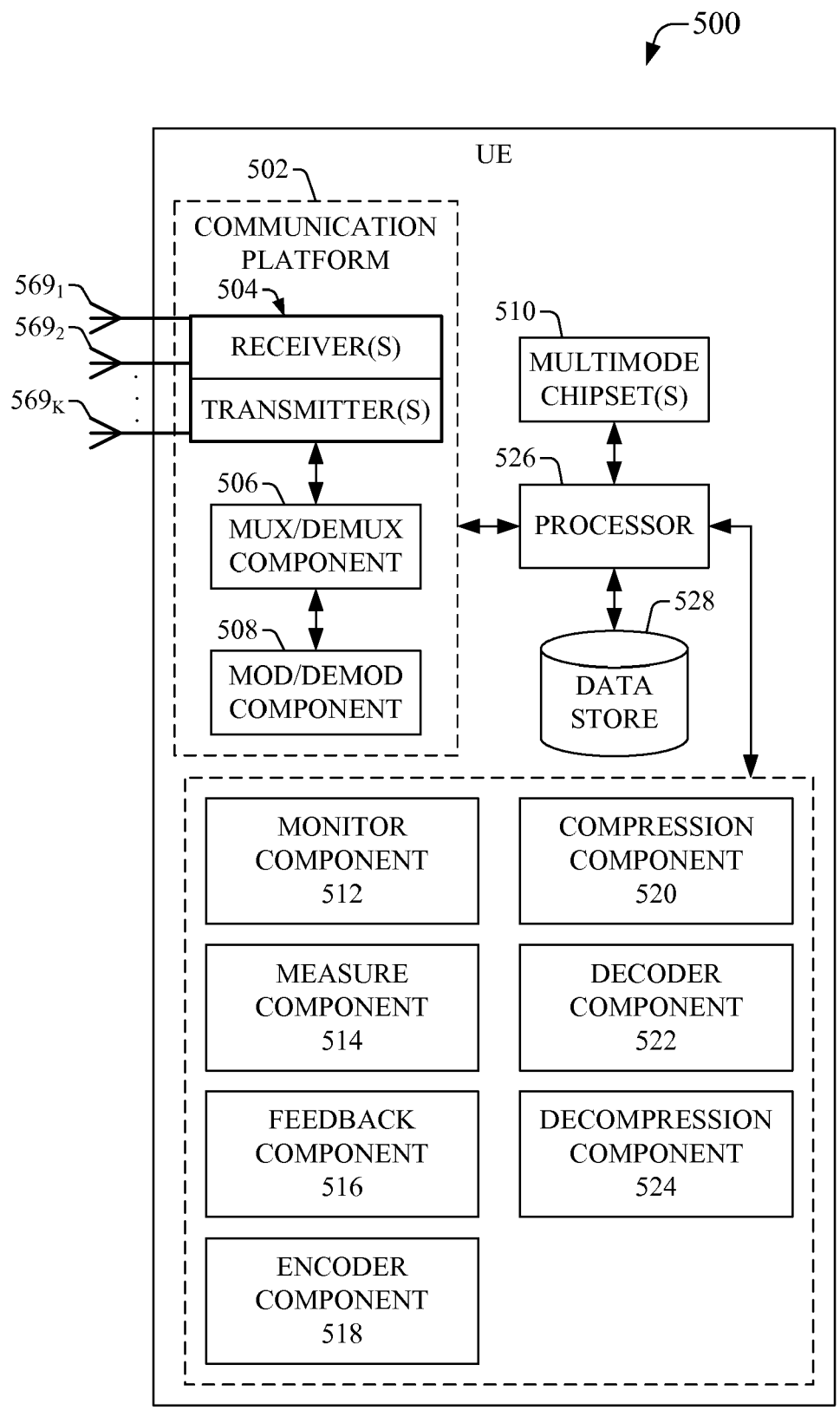
FIG. 5 depicts a block diagram of an example mobile device in accordance with an aspect of the disclosed subject matter.

FIG. 5 depicts a block diagram of an example mobile device 500 (e.g., UE) in accordance with an aspect of the disclosed subject matter. In an aspect, the mobile device 500 can be a multimode access terminal, wherein a set of antennas $569_1$-$569_Q$ (Q is a positive integer) can receive and transmit signal(s) from and to wireless devices like access points, access terminals, wireless ports and routers, and so forth, that operate in a radio access network. It should be appreciated that antennas $569_1$-$569_Q$ are a part of communication platform 502, which comprises electronic components and associated circuitry that provide for processing and manipulation of received signal(s) and signal(s) to be transmitted; e.g., receivers and transmitters 504, multiplexer/demultiplexer (mux/demux) component 506, and modulation/demodulation (mod/demod) component 508.

In another aspect, multimode operation chipset(s) 510 can allow the mobile device 500 to operate in multiple communication modes in accordance with disparate technical specification for wireless technologies. In an aspect, multimode operation chipset(s) 510 can utilize communication platform 502 in accordance with a specific mode of operation (e.g., voice, Global Positioning System (GPS)). In another aspect, multimode operation chipset(s) 510 can be scheduled to operate concurrently (e.g., when Q>1) in various modes or within a multitask paradigm.

In still another aspect, the mobile device 500 can include a monitor component 512 that can monitor and detect various parameters relating to communication conditions (e.g., RF link, bandwidth, QoS), associated with the mobile device 500. The mobile device 500 can contain a measure component 514 that can measure the amount or value of the respective parameters relating to communication conditions associated with the mobile device 500. The mobile device 500 can employ a FB component 516 that can operate in conjunction with the communication platform 502 to communicate FB information relating to the communication conditions (e.g., measured parameters) to an edge adaptation node via the base station serving the mobile device 500 to facilitate adaptation of rate coding or data rate in the bottom tier associated with the mobile device 500.

In yet another aspect, the mobile device 500 can comprise an encoder 518 that can encode data in accordance with an encoding algorithm, and can operate in conjunction with a compression component 520 to compress data in accordance with a desired rate coding or data rate using a desired compression algorithm, where the compression can be lossless or lossy. The mobile device 500 can contain a decoder 522 that can decode data in accordance with an decoding algorithm (which can correspond to the encoding algorithm used to encode the data), and can operate in conjunction with a decompression component 524 to decompress data in accordance with a desired rate coding or data rate using a desired decompression algorithm (which can correspond with the compression algorithm employed to compress the data).

The mobile device 500 also can include a processor(s) 526 that can be configured to confer functionality, at least in part, to substantially any electronic component within the mobile device 500, in accordance with aspects of the subject innovation. As an example, the processor(s) 526 can facilitate enabling the mobile device 500 to measure communication conditions associated with the mobile device 500 and transmit FB information relating to the communication conditions to an edge adaptation node via the base station serving the mobile device 500. Further, the processor(s) 526 can facilitate enabling the mobile device 500 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

The mobile device 500 also can contain a data store 528 that can store data structures (e.g., user data, metadata); code structure(s) (e.g., modules, objects, classes, procedures) or instructions; FB information relating to communication conditions associated with the mobile device 500; rate coding information associated with the mobile device 500; network or device information like policies and specifications, attachment protocols; code sequences for scrambling, spreading and pilot (e.g., reference signal(s)) transmission; frequency offsets; cell IDs; and so on. In an aspect, the processor(s) 526 can be functionally coupled (e.g., through a memory bus) to the data store 528 in order to store and retrieve information (e.g., rate coding information, FB information, etc.) desired to operate and/or confer functionality, at least in part, to communication platform 502, multimode operation chipset(s) 510, monitor component 512, measure component 514, FB component 516, encoder 518, compression component 520, decoder 522, decompression 524, and/or substantially any other operational aspects of the mobile device 500.

Figure 6:
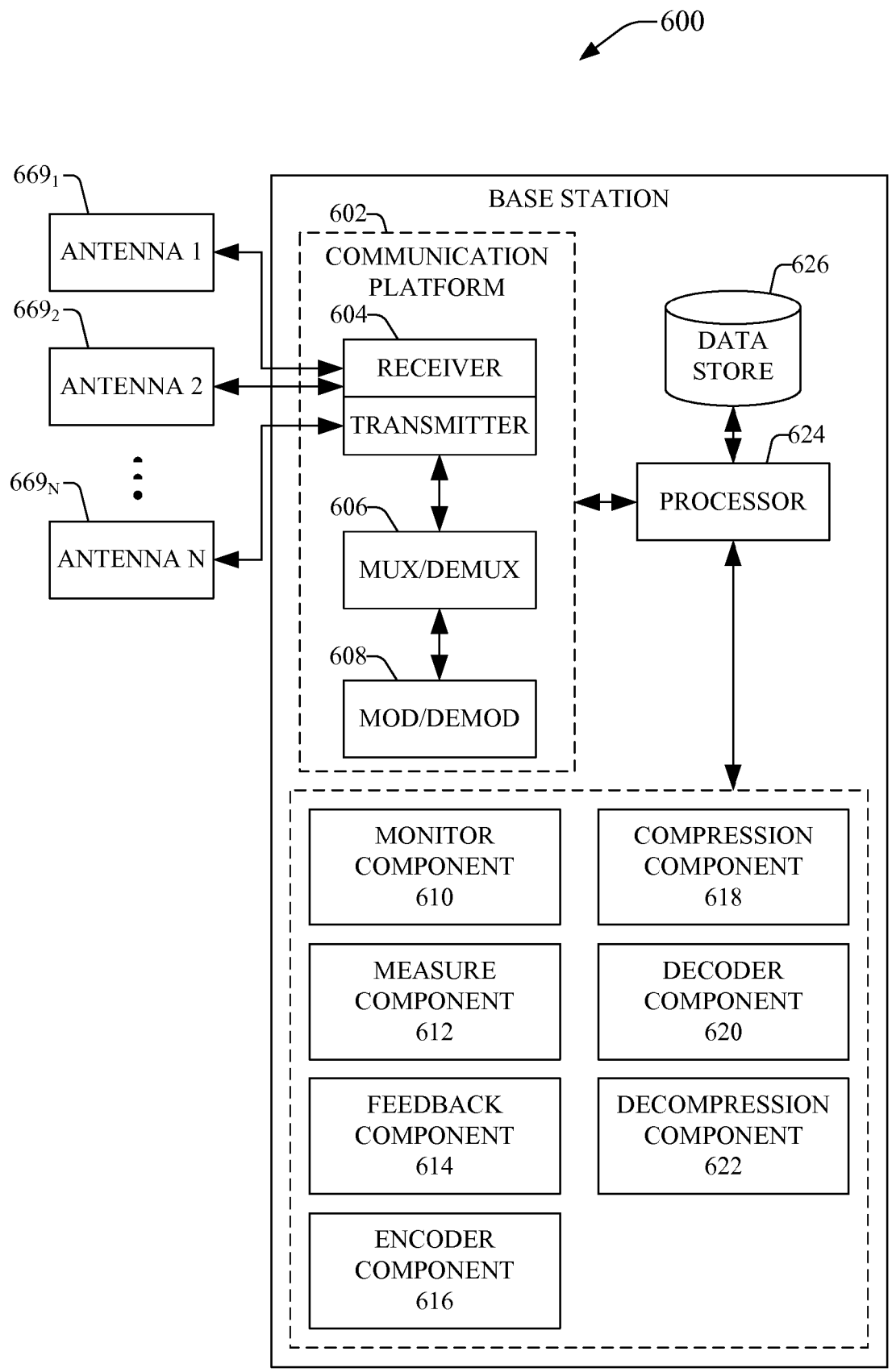
FIG. 6 illustrates a block diagram of an example base station in accordance with an aspect of the disclosed subject matter.

FIG. 6 illustrates a block diagram of an example base station 600 in accordance with an aspect of the disclosed subject matter. The base station 600 can receive and transmit signal(s) from and to wireless devices like access points (e.g., base stations, femto access points), access terminals, wireless ports and routers, and the like, through a set of antennas $669_1$-$669_N$. It should be appreciated that while antennas $669_1$-$669_N$ are a part of a communication platform 602, which comprises electronic components and associated circuitry that can provide for processing and manipulation of received signal(s) and signal(s) to be transmitted. In an aspect, the communication platform 602 can include a receiver/transmitter 604 that can convert signal from analog to digital upon reception, and from digital to analog upon transmission. In addition, receiver/transmitter 604 can divide a single data stream into multiple, parallel data streams, or perform the reciprocal operation.

In an aspect, coupled to receiver/transmitter 604 can be a multiplexer/demultiplexer (mux/demux) 606 that can facilitate manipulation of signal in time and frequency space. The mux/demux 606 can multiplex information (e.g., data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 606 can scramble and spread information (e.g., codes) according to substantially any code known in the art, e.g., Hadamard-Walsh codes, Baker codes, Kasami codes, polyphase codes, and so on. A modulator/demodulator (mod/demod) 608 also can be part of an operational group, and can modulate information according to multiple modulation techniques, such as frequency modulation, amplitude modulation (e.g., M-ary quadrature amplitude modulation (QAM), with M a positive integer), phase-shift keying (PSK), and the like.

In still another aspect, the base station 600 can include a monitor component 610 that can monitor and detect various parameters relating to communication conditions (e.g., RF link, bandwidth, QoS), associated with a mobile device being served by the base station 600. The base station 600 also can contain a measure component 612 that can measure the amount or value of the respective parameters relating to communication conditions associated with the served mobile device. The base station 600 can employ a FB component 614 that can operate in conjunction with the communication platform 602 to communicate FB information relating to the communication conditions (e.g., measured parameters) to an edge adaptation node associated with the base station to facilitate adaptation of rate coding or data rate in the bottom tier associated with the base station 600.

In yet another aspect, the base station 600 can comprise an encoder 616 that can encode data in accordance with an encoding algorithm, and can operate in conjunction with a compression component 618 to compress data in accordance with a desired rate coding or data rate using a desired compression algorithm, where the compression can be lossless or lossy. The base station 600 can contain a decoder 620 that can decode data in accordance with an decoding algorithm (which can correspond to the encoding algorithm used to encode the data), and can operate in conjunction with a decompression component 622 to decompress data in accordance with a desired rate coding or data rate using a desired decompression algorithm (which can correspond with the compression algorithm employed to compress the data).

The base station 600 also can comprise a processor(s) 624 configured to confer and/or facilitate providing functionality, at least partially, to substantially any electronic component in or associated with the base station 600. For instance, the processor(s) 624 can facilitate enabling the monitor component 610 to monitor, detect, or receive information relating to communication conditions associated with the served mobile device, and the FB component 614 to communicate FB information relating to the communication conditions to an edge adaptation node. In addition, the processor(s) 624 can facilitate operations on data (e.g., symbols, bits, or chips) for multiplexing/demultiplexing, such as effecting direct and inverse fast Fourier transforms, selection of modulation rates, selection of data packet formats, inter-packet times, etc.

In another aspect, the base station can include a data store 626 that can store data structures; code instructions; FB information relating to communication conditions associated with the UE served by the base station 600; rate coding information associated with the served UE; system or device information like policies and specifications; code sequences for scrambling; spreading and pilot transmission; floor plan configuration; access point deployment and frequency plans; scheduling policies; and so on. The processor(s) 624 can be coupled to the data store 626 in order to store and retrieve information (e.g., rate coding information, the FB information, etc.) desired to operate and/or confer functionality to the communication platform 602, receiver/transmitter 604, mux/demux component 606, mod/demod 608, monitor component 610, measure component 612, FB component 614, encoder component 616, compression component 618, decoder component 620, decompression component 622, and/or other operational components of base station 600.

In view of the example systems described herein, example methodologies that can be implemented in accordance with the disclosed subject matter can be better appreciated with reference to flowcharts in FIGS. 7-13. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 7:
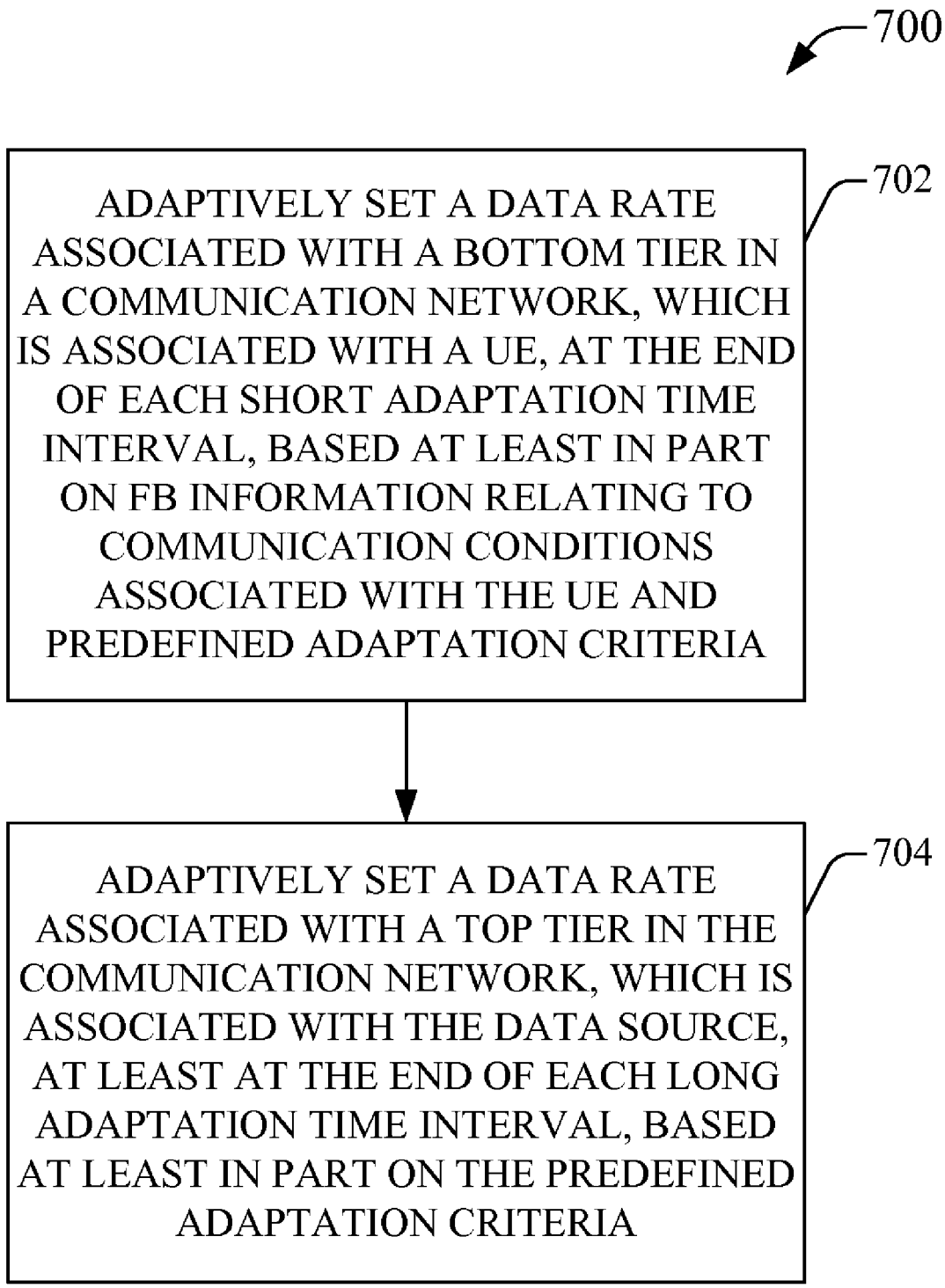
FIG. 7 illustrates a flowchart of an example methodology for controlling data rates or rate codings of respective tiers in a communication network having multiple tiers in accordance with an aspect of the disclosed subject matter.

FIG. 7 presents a flowchart of an example methodology 700 for controlling data rates or rate codings of respective tiers in a communication network having multiple tiers in accordance with an aspect of the disclosed subject matter. At 702, a data rate associated with a bottom tier in the communication network, which is associated with a UE, can be adaptively set at the end of each short adaptation time interval, based at least in part on FB information relating to communication conditions associated with the UE and predefined adaptation criteria, to facilitate communicating data between a data source and the UE. In an aspect, when an application or service is initiated to communicate data between the data source and UE, a multi-tier controller can receive the FB information relating to the communication conditions (e.g., RF link, bandwidth, QoS, etc.) associated with the UE and can determine an initial data rate (e.g., corresponding to a rate coding) to be employed in the bottom tier (associated with the UE) based at least in part on the FB information regarding the communication conditions and the predefined adaptation criteria. The data rate associated with the bottom tier (e.g., data rate to be employed by the UE, and an edge adaptation node and base station associated therewith) can be set to the determined data rate for the bottom tier. At the end of each short adaptation time interval (e.g., when a short time threshold has been reach), the multi-tier controller can adaptively determine and set the data rate associated with the bottom tier to a new data rate (which can be the same data rate or a different data rate from the previous data rate) associated with the bottom tier based at least in part on the FB information relating to the communication conditions associated with the UE that is received by the multi-tier controller during the short adaptation time interval that has just ended.

At 704, a data rate associated with a top tier in the communication network, which is associated with the data source, can be adaptively set at least at the end of each long adaptation time interval, based at least in part on the predefined adaptation criteria. In an aspect, the multi-tier controller initially can set the data rate associated with the top tier (e.g., data rate output from a source adaptation node that receives data from a data source communicating data to the UE) to the same data rate associated with the bottom tier, or another data rate, as desired, based at least in part on the predefined adaptation criteria. At the end of each long adaptation time interval (or when dynamically triggered to re-adapt a data rate, for example, as described herein), the multi-tier controller can adaptively determine and set a new data rate (which can be the same data rate or a different data rate from the previous data rate) associated with the top tier based at least in part on the data rates associated with the bottom tier (or data rates associated with a middle tier immediately below the top tier, if there is such a middle tier) during the long adaptation time interval that has just ended and the predefined adaptation criteria. For example, the various data rates employed for the bottom tier (or middle tier, when applicable) during the last long adaptation time interval can be averaged (or a trending data rate determined) and a desired margin amount can be applied to adjust the average data rate (or trending data rate) to determine a new data rate associated with the top tier during the next long adaptation time interval.

Figure 8:
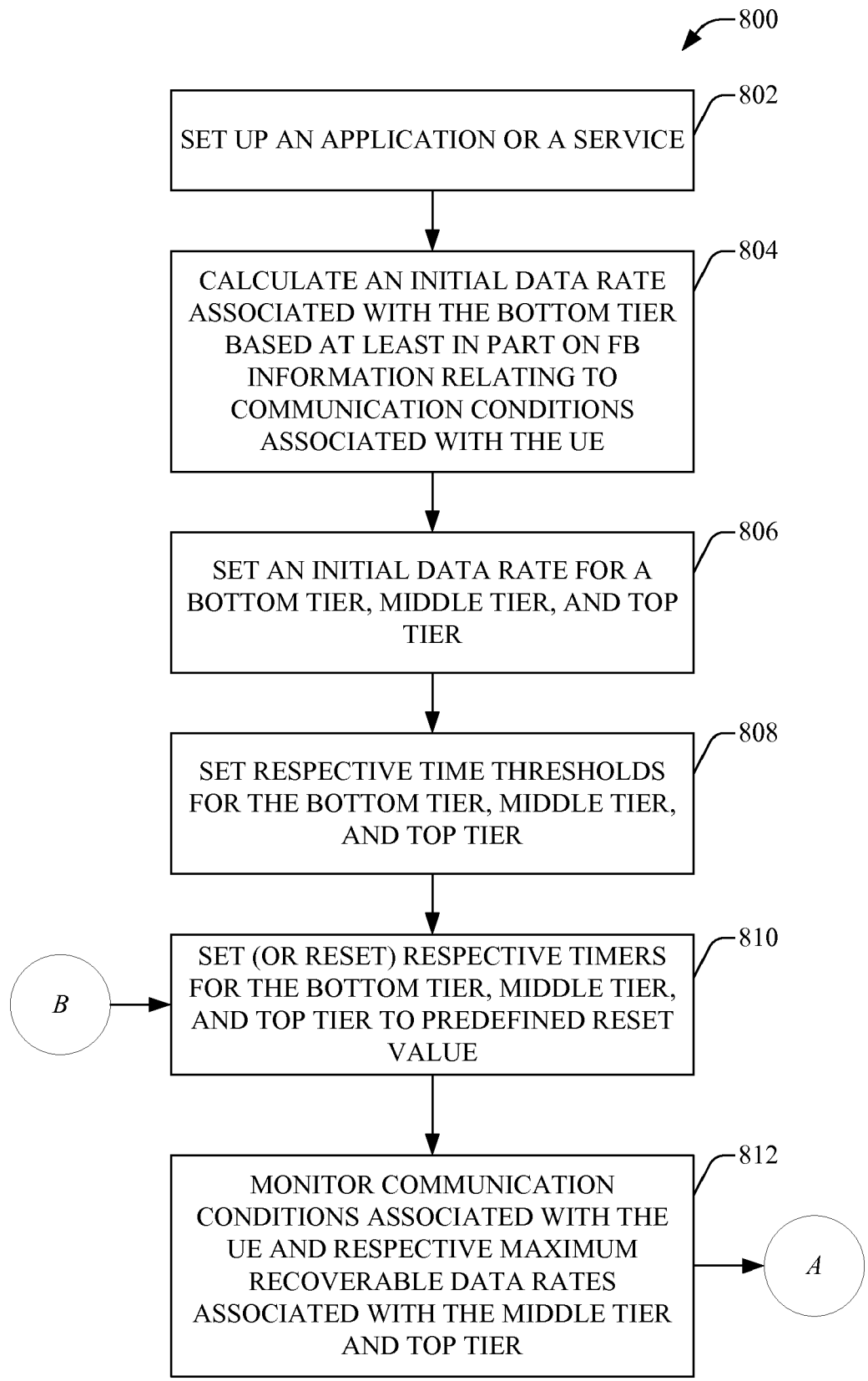
FIG. 8 depicts a flowchart of an example methodology that can facilitate adapting data rates or rate codings of respective tiers in a communication network having multiple tiers in accordance with an aspect of the disclosed subject matter.

FIG. 8 depicts a flowchart of an example methodology 800 that can facilitate adapting data rates or rate codings of respective tiers in a communication network having multiple tiers in accordance with an aspect of the disclosed subject matter. At 802, an application or a service can be set up. The application or service can be set up for the UE in response to a request for the application or service. At 804, an initial data rate associated with the bottom tier can be calculated based at least in part on FB information relating to communication conditions associated with the UE. In an aspect, when the application or service is set up, an initial data rate can be determined for the bottom tier based at least in part on FB information relating to communication conditions associated with the UE.

At 806, an initial data rate can be set for a bottom tier, middle tier, and top tier. In an aspect, the initial data rate for the bottom tier can be set to the data rate calculated for the bottom tier (or as a function of the calculated data rate), and, as desired, the respective data rates for the middle tier and top tier also can be set to the same initial data rate of the bottom tier. It is to be appreciated and understood that instead of initially setting all the tiers to the same data rate, as desired, the respective data rates for the middle tier and top tier can be set to different initial data rates than the initial data rate for the bottom tier and/or different initial data rates than each other. For example, the output data rate for a source adaptation node in the upper tier can be set to the desired initial data rate; the input data rate and output data rate for an intermediate adaptation node associated with a middle tier can be set to the desired initial rate; the input data rate and output data rate for an edge adaptation node associated with a bottom tier can be set to the desired initial data rate; and the input data rate for the UE can be set to the desired initial data rate At 808, respective time thresholds can be set for the bottom tier, middle tier, and top tier. For instance, a short time threshold can be set for the bottom tier, an intermediate time threshold can be set for the middle tier, and a long time threshold can be set for the top tier, where the long time threshold can result in the longest time interval between rate adaptations for the top tier in relation to the adaptation time intervals for the other tiers, the short time threshold can result in the shortest time interval between rate adaptation for the bottom tier in relation to the adaptation time intervals for the other tiers, and the intermediate time threshold can result in a time interval between rate adaptations for the middle tier that is longer than the shortest adaptation time interval and less than the longest adaptation time interval.

At 810, respective timers for the bottom tier, middle tier, and top tier can be set (or re-set) to a predefined reset value (e.g., 0). The respective timers initially can be set to the predefined reset value and can adjust (e.g., increment, decrement) from that point until a respective time threshold is reached, where rate adaptation can be performed on a respective tier when the respective time threshold is reached, and that timer can be re-set to the predefined reset value. At 812, communication conditions associated with the UE and respective maximum recoverable data rates associated with the middle tier and top tier can be monitored. For instance, the multi-tier controller can monitor and receive FB information relating to the communication conditions associated with the UE, for example, from an edge adaptation node; the maximum recoverable data rate associated with the middle tier from an intermediate adaptation node; and the maximum recoverable data rate associated with the top tier from a source adaptation node. Such information can be utilized to facilitate calculating respective data rates to be employed for each tier during respective adaptations of data rates for the tiers. At this point, methodology can proceed to reference point A, where rate adaptation can continue for the bottom tier as more fully described with regard to FIG. 9 and methodology 900, rate adaptation can continue for the middle tier as more fully described with regard to FIG. 10 and methodology 1000, and rate adaptation can continue for the top tier as more fully described with regard to FIG. 11 and methodology 1100.

Figure 9:
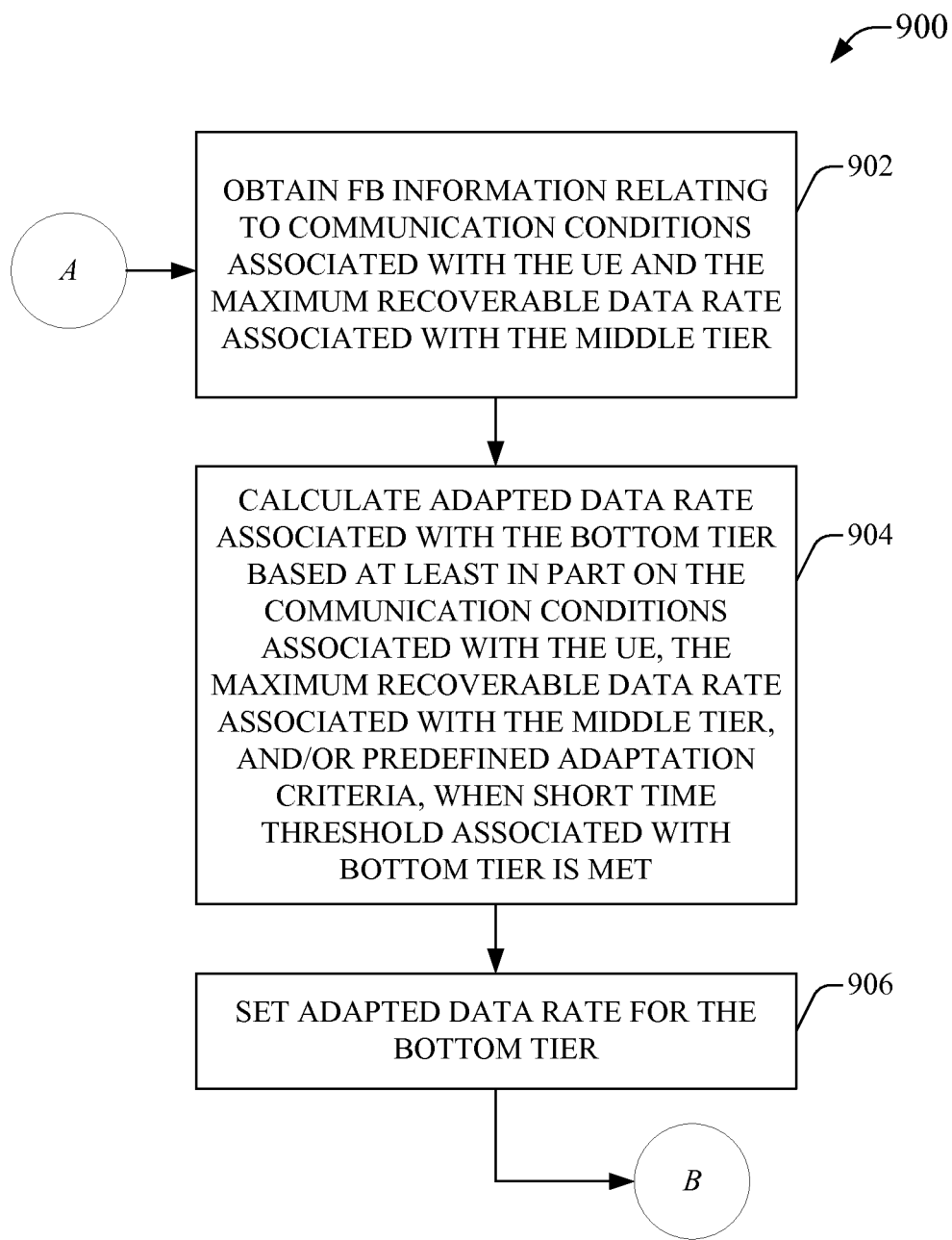
FIG. 9 illustrates a flowchart of an example methodology that can adapt data rates or rate codings associated with a bottom tier in a communication network having multiple tiers in accordance with an aspect of the disclosed subject matter in accordance with an aspect of the disclosed subject matter.

FIG. 9 illustrates a flowchart of an example methodology 900 that can adapt rate codings or data rates associated with a bottom tier in a communication network having multiple tiers in accordance with an aspect of the disclosed subject matter. In an aspect, the methodology 900 can proceed from reference point A, from where methodology 800 left off. At 902, FB information relating to communication conditions associated with the UE and the maximum recoverable data rate associated with the middle tier can be obtained. In an aspect, a multi-tier controller can receive the FB information relating to communication conditions of the UE can be received from the UE and/or base station serving the UE via an edge adaptation node associated with the bottom tier, and the maximum recoverable data rate associated with the middle tier can be received from an intermediate adaptation node associated with the middle tier.

At 904, when the short time threshold associated with the bottom tier is met, an output data rate associated with the bottom tier can be calculated based at least in part on the communication conditions associated with the UE, the maximum recoverable data rate associated with the middle tier, and/or predefined adaptation criteria. In an aspect, the multi-tier controller can utilize techniques, as are well known in the art, to facilitate calculating the output data rate for the bottom tier to adapt the output data rate for the bottom tier. At 906, the output data rate can be set for the bottom tier. In an aspect, the multi-tier controller can facilitate setting the output data rate associated with the bottom tier to the value of the calculated output data rate by communicating the output data rate to the edge adaptation node and instructing the edge adaptation node to set the output data rate of its encoder-decoder to the calculated output data rate. The multi-tier controller also can communicate information regarding the input data rate of the UE to the edge adaptation node, which can forward that information to the UE via the serving base station so that the UE can set the input data rate of its encoder-decoder to the calculated data rate. At this point, methodology 900 can proceed to reference point B. At this point, the subject innovation can return to methodology 800 and can proceed from reference point B to reference numeral 810, where the timer associated with the bottom tier can be re-set to the predefined reset value, and can increment from that point towards the short time threshold associated with the bottom tier; and at 812, communication conditions associated with the UE and the maximum recoverable data rate associated with the middle tier can continue to be monitored.

Figure 10:
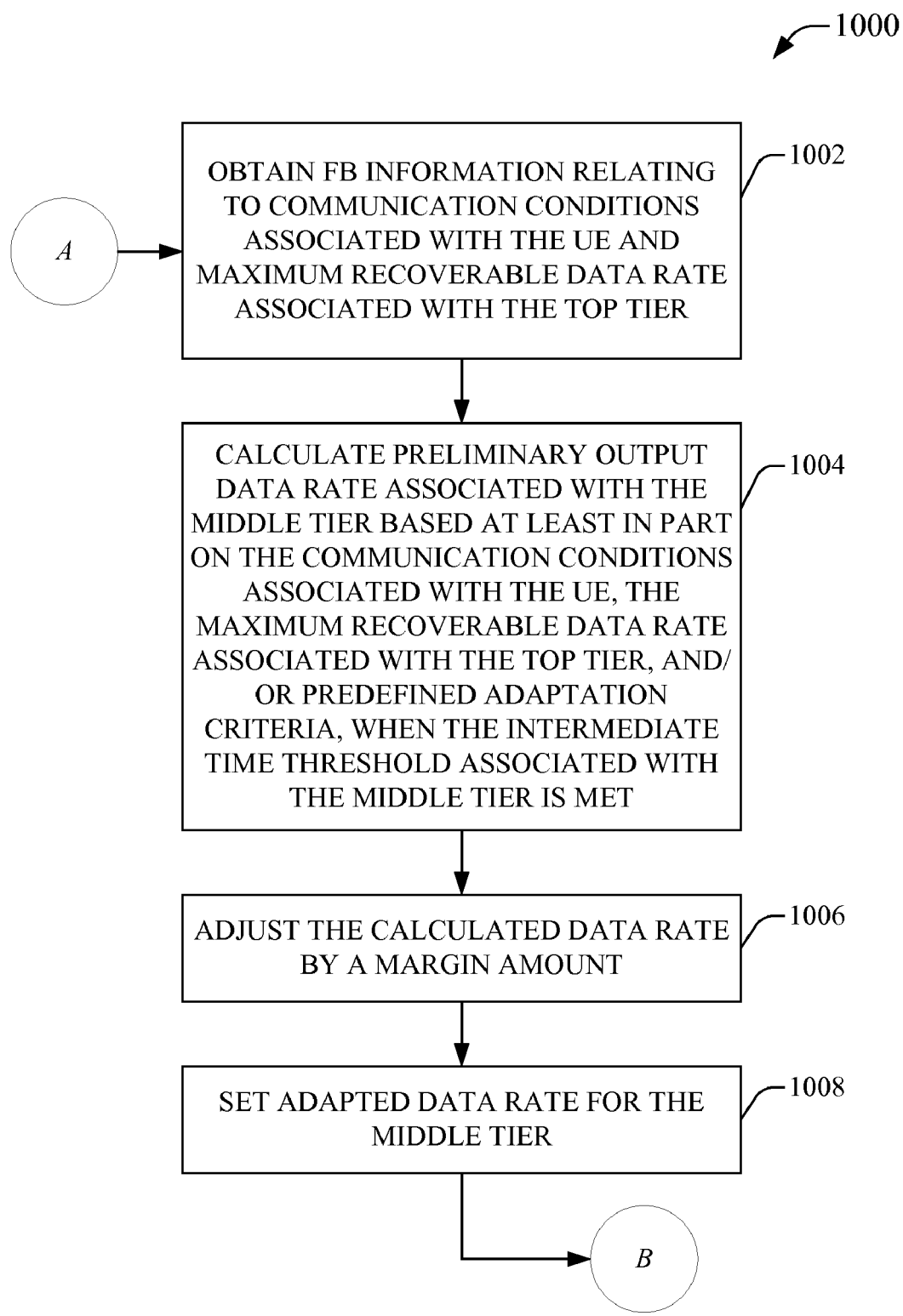
FIG. 10 depicts a flowchart of an example methodology that can that can adapt data rates or rate codings associated with a middle tier in a communication network having multiple tiers in accordance with an aspect of the disclosed subject matter.

FIG. 10 depicts a flowchart of an example methodology 1000 that can that can adapt data rates or rate codings associated with a middle tier in a communication network having multiple tiers in accordance with an aspect of the disclosed subject matter. In an aspect, the methodology 1000 can proceed from reference point A, from where methodology 800 left off. At 1002, FB information relating to communication conditions associated with the UE and the maximum recoverable data rate associated with the top tier can be obtained. In an aspect, a multi-tier controller can receive the FB information relating to communication conditions associated with the UE from the UE and/or base station serving the UE via an edge adaptation node associated with the bottom tier, and the maximum recoverable data rate associated with the top tier can be received from the source adaptation node associated with the top tier. Since the time threshold associated with the bottom tier is significantly shorter than the time threshold associated with the middle tier, the data rates associated with the bottom tier will be adapted a number of times during the time interval between adaptations for the middle tier. The information regarding these various data rates associated with the bottom tier can be tracked and stored by the multi-tier controller and can be part of the FB information relating to the communications associated with the UE, and can be utilized to facilitate calculating the adapted data rate associated with the middle tier when it is next adapted (e.g., at the end of the applicable adaptation time interval).

At 1004, when the intermediate time threshold associated with the middle tier is met, a preliminary data rate associated with the middle tier can be calculated based at least in part on the communication conditions associated with the UE, the maximum recoverable data rate associated with the top tier, and/or predefined adaptation criteria. In accordance with various aspects, the multi-tier controller can calculate a preliminary data rate associated with the middle tier by averaging the various adapted data rates associated with the bottom tier (e.g., various input data rates associated with the UE) that occurred during the last adaptation time interval associated with the middle tier, or can employ a trend algorithm that can account for a trend in adapted data rates associated with the bottom tier and can calculate a data rate based at least in part on the trend of the adapted data rates associated with the bottom tier that occurred during the last adaptation time interval associated with the middle tier (e.g., data rates towards the end of the middle-tier adaptation time interval can be weighted higher than earlier data rates), or another type of algorithm can be employed and calculation performed to determine a data rate (e.g., preliminary data rate) which can be used as a basis for determining the adapted data rate associated with the middle tier.

At 1006, the calculated data rate (e.g., preliminary data rate) can be adjusted (e.g., increased) by a margin amount. In an aspect, the multi-tier controller can determine or calculate a margin amount that can be applied to the calculated data rate associated with the middle tier to adjust the calculated data rate, and the adjusted data rate can be the adapted data rate associated with the middle tier. In accordance with various aspects, the margin amount can be determined as a percentage of the calculated data rate for the middle tier, where the percentage amount can be based at least in part on volatility of communication conditions associated with the bottom tier, or can be a specified amount ranging from 0 to a desired margin amount, or can be determined using another desired margin algorithm. The margin amount for the middle tier can be different (or same, as desired) from the margin amount applied to other tiers (e.g., top tier).

At 1008, the adapted data rate can be set for the middle tier. In an aspect, the multi-tier controller can specify that the adapted data rate, as determined, is the data rate to be applied in the middle tier, and can communicate rate coding information that corresponds to the adapted data rate to the intermediate adaptation node and can instruct the intermediate adaptation node to set the output data rate of its encoder-decoder to the adapted data rate. The multi-tier controller also can communicate information (e.g., rate coding information) regarding the input data rate for the edge adaptation node to the edge adaptation node, and the edge adaptation node can set the input data rate of its encoder-decoder to the adapted data rate associated with the middle tier. At this point, methodology 1000 can proceed to reference point B. At this point, the subject innovation can return to methodology 800 and can proceed from reference point B to reference numeral 810, where the timer associated with the middle tier can be re-set to the predefined reset value, and can increment (or decrement, as desired) from that point towards the intermediate time threshold associated with the middle tier; and at 812, communication conditions associated with the ULE and the maximum recoverable data rate associated with the top tier can continue to be monitored.

Figure 11:
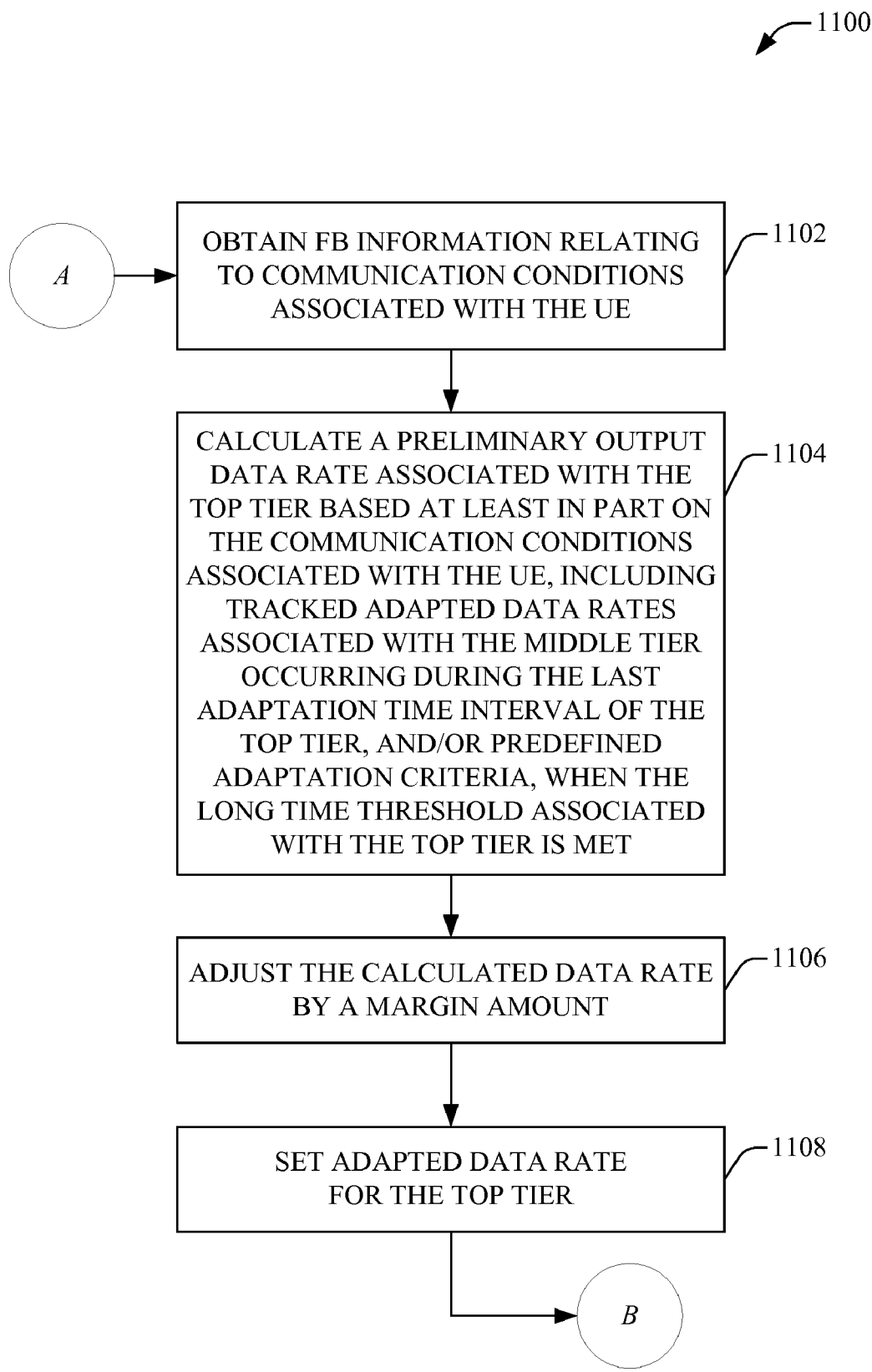
FIG. 11 illustrates a flowchart of an example methodology that can that can adapt data rates or rate codings associated with a top tier in a communication network having multiple tiers in accordance with an aspect of the disclosed subject matter.

FIG. 11 depicts a flowchart of an example methodology 1100 that can that can adapt data rates or rate codings associated with a top tier in a communication network having multiple tiers in accordance with an aspect of the disclosed subject matter. In an aspect, the methodology 1100 can proceed from reference point A, from where methodology 800 left off. At 1102, FB information relating to communication conditions associated with the UE can be obtained. In an aspect, a multi-tier controller can receive the FB information relating to communication conditions associated with the UE from the UE and/or base station serving the UE via an edge adaptation node associated with the bottom tier. Further, during the adaptation time interval associated with the top tier, the multi-tier controller also can track the adapted data rates (e.g., adapted output data rates for the intermediate adaptation node) associated with the middle tier occurring during the top-tier adaptation time interval, where the FB information can comprise information relating to tracking the adapted data rates associated with the middle tier. Since the time threshold associated with the middle tier is significantly shorter than the time threshold associated with the top tier, the data rates associated with the middle tier will be adapted a number of times during the time interval between adaptations for the top tier and this information also can be utilized to facilitate calculating the adapted data rate associated with the top tier (e.g., adapted output data rate of the source adaptation node) when it is adapted.

At 1104, when the long time threshold associated with the top tier is met, a preliminary data rate associated with the top tier can be calculated based at least in part on the communication conditions associated with the UE, including the tracked adapted data rates associated with the middle tier (e.g., various adapted output data rates of the intermediate adaptation node) occurring during the last adaptation time interval of the top tier, and/or predefined adaptation criteria. In accordance with various aspects, the multi-tier controller can calculate the preliminary data rate associated with the top tier by averaging the adapted data rates associated with the middle tier that occurred during the last adaptation time interval associated with the top tier, or can employ a trend algorithm that can account for a trend in adapted data rates associated with the middle tier (and/or bottom tier) and can calculate an adapted data rate for the top tier based at least in part on the trend of the adapted data rates associated with the middle tier that occurred during the last adaptation time interval associated with the top tier (e.g., adapted data rates toward the end of the top-tier adaptation time interval can be weighted higher than earlier data rates), or another type of algorithm can be employed and calculation performed to determine a preliminary data rate which can be used as a basis for determining the adapted data rate associated with the top tier.

At 1106, the calculated data rate can be adjusted (e.g., increased) by a margin amount. In an aspect, the multi-tier controller can determine or calculate a margin amount, associated with the top tier, that can be applied to the calculated data rate associated with the top tier to adjust the calculated data rate, and the adjusted data rate can be the adapted data rate associated with the top tier. In accordance with various aspects, the margin amount for the top tier can be determined as a percentage of the calculated data rate, where the percentage amount can be based at least in part on volatility of communication conditions associated with the middle tier and/or bottom tier, or can be a specified amount ranging from 0 to a desired margin amount, or can be determined using another desired margin algorithm. The margin amount for the top tier can be different (or same, as desired) from the margin amount applied to other tiers (e.g., middle tier).

At 1108, the adapted data rate can be set for the top tier. In an aspect, the multi-tier controller can specify or set the adapted data rate for the top tier. The multi-tier controller can facilitate setting the adapted data rate associated with the top tier by communicating rate coding information to the source adaptation node and instructing the source adaptation node to set the output data rate of its encoder-decoder to the adapted data rate. The multi-tier controller also can communicate rate coding information relating to the adapted data rate of the top tier to facilitate setting the input data rate for the intermediate adaptation node to the adapted data rate associated with the top tier. The intermediate adaptation node can receive the rate coding information and can set the input data rate of its encoder-decoder to the adapted data rate. At this point, methodology 1100 can proceed to reference point B. At this point, the subject innovation can return to methodology 800 and can proceed from reference point B to reference numeral 810, where the timer associated with the top tier can be re-set to the predefined reset value, and can increment (or decrement, as desired) from that point towards the long time threshold associated with the top tier; and at 812, communication conditions associated with the UE can continue to be monitored. The various adapted data rates associated with the middle tier can continue to be tracked and stored as well by the multi-tier controller.

Figure 12:
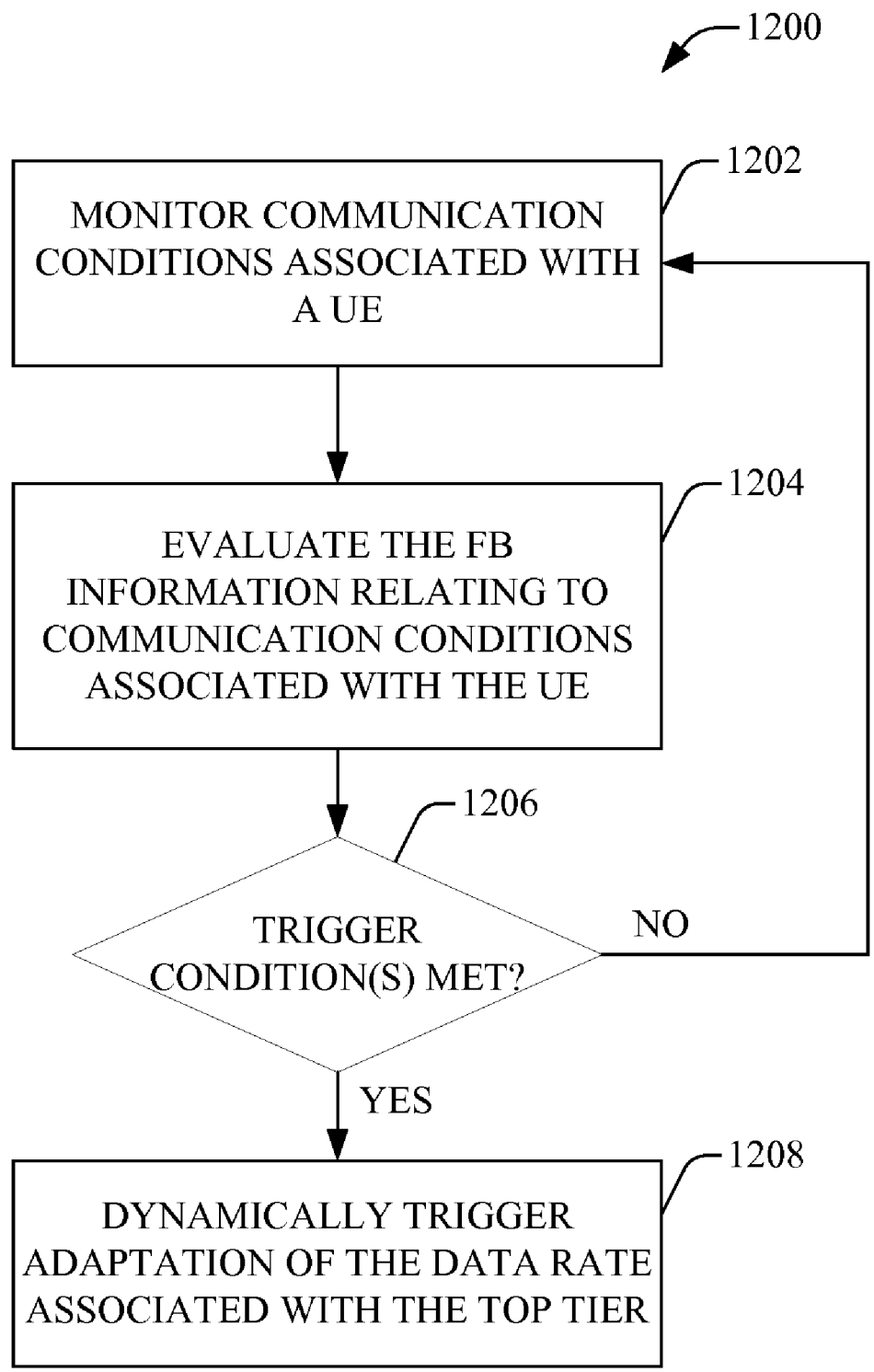
FIG. 12 depicts a flowchart of an example methodology that can dynamically trigger adapting a data rate or rate coding associated with a top tier in a communication network having multiple tiers in accordance with an aspect of the disclosed subject matter.

FIG. 12 depicts a flowchart of an example methodology 1200 that can dynamically trigger adapting a data rate associated with a top tier in a communication network having multiple tiers in accordance with an aspect of the disclosed subject matter. At 1202, communication conditions associated with a UE can be monitored. In an aspect, when the UE accesses an application or a service in the communication network, the UE and/or a base station serving the UE can detect or monitor communication conditions (e.g., RF link, bandwidth, QoS, . . . ) associated with the UE. The multi-tier controller can monitor or detect FB information relating to the communication conditions associated with the ULE and that FB information can be received by the multi-tier controller via an edge adaptation node connected to the multi-tier controller and associated with the serving base station.

At 1204, the FB information relating to communication conditions associated with the UE can be evaluated. The multi-tier controller can evaluate the FB information, in part by applying predefined adaptation criteria and evaluating the FB information against such criteria, to facilitate determining whether adaptation of the data rate for the top tier should be dynamically and automatically triggered, even though the adaptation time interval of the top tier is not yet completed (e.g., the long time threshold associated with the top tier has not been reached). For example, if the data rate associated with the bottom tier changes (e.g., increases) beyond a predefined threshold amount of change (e.g., change in amount of data rate, percentage change in data rate) over a predefined period of time (e.g., period of time that is shorter than the adaptation time interval associated with the top tier).

At 1206, a determination can be made regarding whether adaptation of the data rate associated with the top tier is to be dynamically triggered by determining whether a trigger condition(s) has been met, based at least in part on the predefined adaptation criteria. If, at 1206, it is determined that the dynamic trigger condition(s) (e.g., corresponding to applicable predefined adaptation criteria) for dynamically triggering adaptation of the data rate associated with the top tier has not been met, methodology 1200 can proceed to reference numeral 1202, where methodology 1200 can be employed to continue monitoring communication conditions associated with the UE, and methodology 1200 can proceed from that point. If, at 1206, it is determined that the dynamic trigger condition(s) (e.g., corresponding to applicable predefined adaptation criteria) for dynamically triggering adaptation of the data rate associated with the top tier has been met, at 1208, adaptation of the data rate associated with the top tier can be dynamically triggered to occur. In an aspect, the multi-tier controller can dynamically and automatically trigger adaptation of the data rate associated with the top tier when the dynamic trigger condition(s) has been met, and can calculate a new adapted data rate associated with the top tier based at least in part on the predefined adaptation criteria. For example, the multi-tier controller can evaluate the communication conditions associated with the UE and/or data rates associated with a middle tier(s), if any, during the adaptation time interval for the top tier or another predefined period of time, and can determine a new adapted data rate for the top tier.

As desired, the long timer associated with the top tier can be re-set (e.g., to 0) or can continue to increment (e.g., toward the long time threshold associated with the top tier). Also, it is to be appreciated and understood that, while methodology 1200 relates to dynamic triggering adaptation of a data rate associated with a top tier, the subject innovation is not so limited, and, as desired, adaptation of a data rate(s) associated with a middle tier(s) can be dynamically triggered based at least in part on the predefined adaptation criteria. For instance, the acts of methodology 1200, or acts similar to the acts described with regard to methodology 1200, can be employed to dynamically trigger adaptation of the data rate associated with a middle tier. In an aspect, the dynamic trigger condition(s) applied with regard to a middle tier can be the same or different than the dynamic trigger conditions(s) applied to a top tier, as desired.

Figure 13:
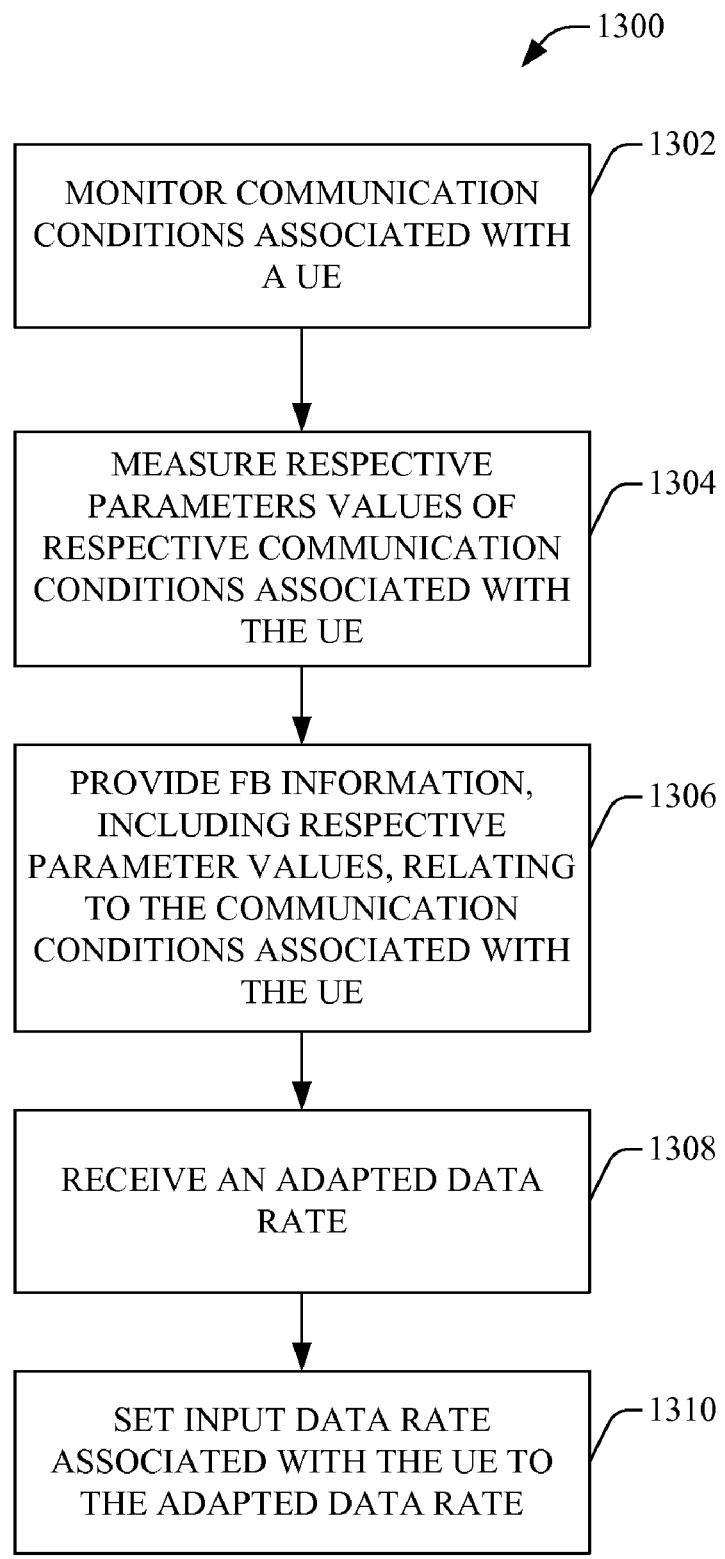
FIG. 13 illustrates a flowchart of an example methodology that can provide feedback (FB) information regarding communication conditions associated with a user equipment (UE) to facilitate adapting rate codings or data rates for respective tiers in a communication network having multiple tiers in accordance with an aspect of the disclosed subject matter.

FIG. 13 depicts a flowchart of an example methodology 1300 that can provide FB information regarding communication conditions associated with a UE to facilitate adapting rate codings or data rates for respective tiers in a communication network having multiple tiers in accordance with an aspect of the disclosed subject matter. At 1302, communication conditions associated with a UE can be monitored. In an aspect, when the UE accesses an application or a service in the communication network, the UE and/or a base station serving the UE can detect or monitor communication conditions (e.g., RF link, bandwidth, QoS, . . . ) associated with the UE.

At 1304, respective parameters values of respective communication conditions associated with the UE can be measured. In an aspect, the UE and/or serving base station can measure respective parameters values of respective communication conditions associated with the UE.

At 1306, FB information, including respective parameter values, relating to the communication conditions associated with the UE can be provided. In an aspect, the serving base station and/or the UE (via the serving base station) can provide FB information relating to the communications associated with the UE to an edge adaptation node associated with the serving base station and bottom tier in the communication network, and the FB information can be forwarded to the multi-tier controller by the edge adaptation node. The FB information, or at least a portion thereof, can be utilized to facilitate determining and adapting the data rate for the bottom tier as well as other tiers (e.g., top tier, middle tier(s)) in the communication network.

For instance, the FB information over a short adaptation time interval associated with the bottom tier can be utilized to adapt the data rate for the bottom tier relatively frequently. The adapted data rates for the bottom tier that occurred over an adaptation time interval associated with a middle tier can be utilized to facilitate adapting the data rate for the middle tier when the middle-tier adaptation time interval ends. The adapted data rates for the middle tier that occurred over a top-tier adaptation time interval associated with a top tier can be utilized to facilitate adapting the data rate for the top tier when the top-tier adaptation time interval ends.

At 1308, an adapted data rate associated with the bottom tier can be received. In an aspect, the UE can receive information relating to an adapted data rate (e.g., rate coding information) from the multi-tier controller via the edge adaptation node and/or serving base station, where the adapted data rate can be based at least in part on the FB conditions provided by the UE and/or base station at reference numeral 1306. At 1310, the input data rate associated with the UE can be set to the received adapted data rate. In an aspect, the UE can set its input data rate to the adapted data rate received in the information received by the UE from the multi-tier controller.

It is to be appreciated and understood that components (e.g., multi-tier controller, adaptation node (e.g., edge adaptation node, intermediate adaptation node, source adaptation node), UE, base station, core network, data source, . . . ), as described with regard to a particular system or methodology, can include the same or similar functionality as respective components as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system that facilitates adaptation of data rates for respective tiers in a communication network having multiple tiers, comprising:
a multi-tier controller that facilitates adaptation of respective data rates respectively associated with at least a bottom tier and a top tier, based at least in part on feedback information relating to communication conditions associated with a communication device and predefined adaptation criteria, to facilitate communication of data between a data source associated with the top tier and the communication device associated with the bottom tier, wherein the data rate associated with a bottom tier is adapted at an end of each short adaptation time interval and the data rate associated with the top tier is adapted at least at an end of each long adaptation time interval; and
an edge adaptation node that is associated with the communication device and sets its output data rate to the adapted data rate associated with the bottom tier and communicates rate coding information to the communication device to facilitate implementation of the adapted data rate associated with the bottom tier by the communication device.

2. The system of claim 1, the communication conditions relate to at least one of a radio frequency (RF) link between the communication device and a base station, a Quality of Service (QoS) associated with the communication device, or a bandwidth associated with the communication device.

3. The system of claim 1, further comprising:
at least one intermediate adaptation node associated with at least one middle tier located between the top tier and the bottom tier in the communication network, wherein the multi-tier controller facilitates adaptation of a data rate associated with the at least one middle tier at an end of an intermediate adaptation time interval, and the intermediate adaptation time interval is longer than the short adaptation time interval and shorter than the long adaptation time interval, and wherein the at least one intermediate adaptation node sets its output data rate to the adapted data rate associated with the middle tier and its input data rate to the adapted data rate associated with the top tier to facilitate the communication of data between the top tier and the bottom tier.

4. The system of claim 1, when the intermediate adaptation time interval ends, the multi-tier controller determines an adapted data rate associated with the at least one middle tier to be utilized during a next intermediate adaptation time interval by at least one of calculation of an average data rate for a plurality of data rates employed by the bottom tier during the ended intermediate adaptation time interval or determination of a trending data rate for the plurality of data rates, and adding a predefined margin amount of data rate, associated with the at least one middle tier, to the at least one of the average data rate or the trending data rate.

5. The system of claim 4, the trending data rate is determined based at least in part on respectively weighting each of the plurality of data rates employed by the bottom tier during the ended intermediate adaptation time interval, wherein data rates of the plurality of data rate are increasingly weighted more heavily as the end of the intermediate adaptation time interval is closer to occurring.

6. The system of claim 4, when the long adaptation time interval ends, the multi-tier controller determines an adapted data rate associated with the top tier to be utilized during a next long adaptation time interval by at least one of calculation of an average data rate for a plurality of data rates employed by the at least one intermediate tier during the ended intermediate adaptation time interval or determination of a trending data rate for the plurality of data rates, and adding a predefined margin amount of data rate, associated with the top tier, to the at least one of the average data rate or the trending data rate.

7. The system of claim 4, the edge adaptation node is at or associated with an edge of a wireless portion of the communication network, wherein the communication device is a wireless mobile communication device, and the at least one middle tier and the top tier are associated with or located in a wire-line portion of the communication network, wherein the at least one middle tier comprises at least one intermediate adaptation node that sets its output to the adapted data rate associated with the at least one middle tier and its input to the adapted data rate associated with the top tier, and the top tier comprises at least one source node that sets its output to the adapted data rate associated with the top tier.

8. The system of claim 4, the multi-tier controller initially sets the respective data rates associated with the bottom tier, the at least one middle tier, and the top tier to a data rate determined for the bottom tier based at least in part on the communication conditions associated with the communication device when an application or service is initiated.

9. The system of claim 1, the multi-tier controller dynamically and automatically triggers adaptation of the data rate associated with the top tier, based at least in part on the predefined adaptation trigger condition, even when the long adaptation time interval is not ended, wherein the predefined adaptation trigger condition relates to at least one of a predefined amount of increase in the adapted data rate associated with the bottom tier or a predefined percentage of increase in the adapted data rate associated with the bottom tier.

10. The system of claim 1, the predefined adaptation criteria relates to at least one of a particular tier being adapted, a number of tiers in the communication network, radio frequency (RF) link conditions associated with the communication device in a wireless portion of the communication network, respective feedback loop lengths of respective tiers, a maximum recoverable data rate for a tier above another tier being adapted, whether rate coding of a particular tier is being adapted due to a periodic adaptation or a triggered adaptation, an average data rate for data rates of a lower tier during a most recent adaptation time interval, a trending data rate for a tier immediately below a tier being adapted, or a margin employed to facilitate adaptation of a data rate associated with a particular tier.

11. The system of claim 1, the data source is another communication device comprising at least one of a computer, a server, a video player, an audio player, a personal digital assistant (PDA), or a phone, that provides at least one of video content, audio content, textual content, or multimedia content.

12. The system of claim 11, the communication device is at least one of a cellular phone, a smart phone, a personal digital assistant (PDA), a computer, a television, or a set-top box.

13. A method for adapting data rates of respective tiers in a communication network comprising multiple tiers, comprising:
adaptively setting a data rate associated with a bottom tier in the communication network, which is associated with a communication device, at the end of each short adaptation time period associated with the bottom tier, based at least in part on feedback information relating to communication conditions associated with the communication device and predefined adaptation criteria, to facilitate communicating data between a data source and the communication device; and
adaptively setting a data rate associated with a top tier in the communication network, which is associated with the data source, at least at the end of each long adaptation time period, based at least in part on the predefined adaptation criteria.

14. The method of claim 13, further comprising:
determining an initial data rate associated with the bottom tier, at least one intermediate tier, and the top tier based at least in part on feedback information relating to communication conditions associated with the communication device when an application or service is initiated with regard to the communication device;
adaptively setting each of an output of a first adaptation node, an output of a second adaptation node, and an output of a third adaptation node to the initial data rate, wherein the first adaptation node is associated with the bottom tier, the second adaptation node is associated with the at least one middle tier, and the third adaptation node is associated with the top tier;
setting a short time threshold for a bottom-tier timer, an intermediate time threshold for a middle-tier timer, and a long time threshold for a top-tier timer, respectively for each of the bottom tier, the at least one middle tier, and the top tier;
setting the respective timers to a predefined reset value; and
monitoring at least one of communication conditions associated with the communication device, adapted data rates associated with the bottom tier during an intermediate adaptation time period, adapted data rates associated with the at least one middle tier during the long adaptation time period, a maximum recoverable data rate associated with the at least one middle tier, or a maximum recoverable data rate associated with the top tier.

15. The method of claim 14, further comprising:
obtaining feedback information relating to the adaptively setting the data rate associated with the bottom tier, the feedback information comprising at least one of communication conditions associated with the communication device or a maximum recoverable data rate associated with the at least one middle tier;
incrementing the bottom-tier timer; and
when the bottom-tier timer meets the short time threshold:
calculating a data rate for a next short adaptation time period associated with the bottom tier based at least in part on the feedback information;
adaptively setting an output of the first adaptation node to the data rate for the next short adaptation time period associated with the bottom tier, wherein an input associated with the communication device is adaptively set to the data rate for the next short adaptation time period; and
re-setting the bottom-tier timer to the predefined reset value.

16. The method of claim 14, further comprising:
obtaining feedback information relating to the adaptively setting the data rate associated with the at least one middle tier, the feedback information comprising at least one of a plurality of data rates associated with the bottom tier that occurred during the intermediate adaptation time period associated with the at least one middle tier or a maximum recoverable data rate associated with the top tier;
incrementing the middle-tier timer; and
when the middle-tier timer meets the intermediate time threshold:
calculating a preliminary data rate for the at least one middle tier based at least in part on the feedback information;
adjusting the preliminary data rate by a specified margin amount of data rate associated with the at least one middle tier to facilitate determining a data rate for a next intermediate adaptation time period associated with the at least one middle tier;
adaptively setting an output of the second adaptation node to the data rate for the next intermediate adaptation time period, wherein an input associated with the first adaptation node is adaptively set to the data rate for the next intermediate adaptation time period; and
re-setting the middle-tier timer to the predefined reset value.

17. The method of claim 14, further comprising:
obtaining feedback information relating to the adaptively setting the data rate associated with the top tier, the feedback information comprising at least one of a plurality of data rates associated with the at least one middle tier that occurred during the long adaptation time period associated with the top tier;
incrementing the top timer; and
when the top timer meets the long time threshold:
calculating a preliminary data rate for the top tier based at least in part on the feedback information;
adjusting the preliminary data rate by a specified margin amount of data rate associated with the top tier to facilitate determining a data rate for a next long adaptation time period associated with the top tier;
adaptively setting an output of the third adaptation node to the data rate for the next long adaptation time period, wherein an input associated with the second adaptation node is adaptively set to the data rate for the next long adaptation time period; and
re-setting the top-tier timer to the predefined reset value.

18. The method of claim 13, further comprising:
evaluating the feedback information relating to communication conditions associated with the communication device, wherein the feedback information comprising data rates associated with the bottom tier occurring during the long adaptation time period;
determining whether at least one trigger condition is met based at least in part on the predefined adaptation criteria; and
dynamically triggering adaptively setting the data rate associated with the top tier when the at least one trigger condition is met.

19. The method of claim 13, the communication conditions relate to at least one of a radio frequency (RF) link between the communication device and a base station, a Quality of Service (QoS) associated with the communication device, or a bandwidth associated with the communication device.

20. The method of claim 13, wherein the communication device is a wireless mobile communication device located in a wireless portion of the communication network, and the data source is located in a wire-line portion of the communication network, wherein at least a portion of the bottom tier is located in the wireless portion and the top tier is located in the wire-line portion.

21. The method of claim 13, wherein the communication device and the data source are located in a wire-line portion of the communication network, and the bottom tier and top tier are located in the wire-line portion.

22. The method of claim 13, the predefined adaptation criteria relates to at least one of a particular tier being adapted, a number of tiers in the communication network, radio frequency (RF) link conditions associated with the communication device in a wireless portion of the communication network, respective feedback loop lengths of respective tiers, a maximum recoverable data rate for a tier above another tier being adapted, whether rate coding of a particular tier is being adapted due to a periodic adaptation or a triggered adaptation, an average data rate for data rates of a lower tier during a most recent adaptation time interval, a trending data rate for a tier immediately below a tier being adapted, or a margin employed to facilitate adaptation of a data rate associated with a particular tier.

23. A computer-readable medium having instructions stored thereon that, when executed by a processor, cause a computer to perform the following acts:
adapting a data rate associated with a bottom tier in the communication network, which is associated with a user equipment, at the end of each short adaptation time period associated with the bottom tier, based at least in part on feedback information relating to communication conditions associated with the user equipment and predefined adaptation criteria, to facilitate communicating data between a data source and the user equipment; and
adapting a data rate associated with a top tier in the communication network, which is associated with the data source, at least at the end of each long adaptation time period, based at least in part on the predefined adaptation criteria.

24. An apparatus comprising:
means for adaptively setting a data rate associated with a bottom tier in the communication network, which is associated with a mobile communication device, at the end of each short adaptation time period associated with the bottom tier, based at least in part on feedback information relating to communication conditions associated with the mobile communication device and predefined adaptation criteria, to facilitate communicating data between a data source and the mobile communication device; and
means for adaptively setting a data rate associated with a top tier in the communication network, which is associated with the data source, at least at the end of each long adaptation time period, based at least in part on the predefined adaptation criteria.

25. A communication device, comprising:
monitoring communication conditions associated with the communication device;
measuring at least one parameter relating to the communication conditions associated with the communication device; and
transmitting feedback information comprising at least a portion of at least one of the communications conditions or the at least one parameter to facilitate determining respective adapted data rates associated with respective tiers of a communication network having multiple tiers, wherein the communication device is located in a bottom tier, to facilitate communication of data associated with the communication device.

26. The communication device of claim 25, the communication conditions relate to at least one of a radio frequency (RF) link between the communication device and a base station, a Quality of Service (QoS) associated with the communication device, or a bandwidth associated with the communication device.

27. The communication device of claim 25, wherein the communication device is a wireless communication device located in a wireless portion of the communication network, and a data source is located in a wire-line portion of the communication network, wherein at least a portion of the bottom tier is located in the wireless portion and the top tier is located in the wire-line portion, the data source communicates at least a portion of the data to the communication device.

* * * * *